US009688516B2

(12) United States Patent
Billiot et al.

(10) Patent No.: US 9,688,516 B2
(45) Date of Patent: Jun. 27, 2017

(54) ELASTOMERIC LOAD COMPENSATORS FOR LOAD COMPENSATION OF CRANES

(71) Applicant: Oil States Industries, Inc., Arlington, TX (US)

(72) Inventors: Walter Billiot, Houma, LA (US); Joseph Angeron, Houma, LA (US); Danton Gutierrez-Lemini, Grand Prairie, TX (US); Chris Chiasson, Houma, TX (US); Eric Luke, Hurst, TX (US)

(73) Assignee: Oil States Industries, Inc., Arlington, TX (US)

( * ) Notice: Subject to any disclaimer, the term of this patent is extended or adjusted under 35 U.S.C. 154(b) by 508 days.

(21) Appl. No.: 14/207,118

(22) Filed: Mar. 12, 2014

(65) Prior Publication Data

US 2014/0263142 A1      Sep. 18, 2014

Related U.S. Application Data

(60) Provisional application No. 61/800,781, filed on Mar. 15, 2013.

(51) Int. Cl.
*B66C 13/16* (2006.01)
*B66C 13/02* (2006.01)
(Continued)

(52) U.S. Cl.
CPC ............. *B66C 13/16* (2013.01); *B66C 13/02* (2013.01); *B66C 13/04* (2013.01); *B66C 13/066* (2013.01);
(Continued)

(58) Field of Classification Search
CPC ....... B66C 13/16; B66C 13/006; B66C 13/04; B66C 13/02; B66C 23/52
See application file for complete search history.

(56) References Cited

U.S. PATENT DOCUMENTS

| 2,293,936 A | 8/1942 | Crooke |
| 2,801,843 A | 8/1957 | MacCluney |

(Continued)

FOREIGN PATENT DOCUMENTS

| EP | 0508587 A2 | 10/1992 |
| EP | 2998262 A1 | 3/2016 |

(Continued)

OTHER PUBLICATIONS

Rupcic, Zoran, Extended European Search Report, European Patent Application EP15191099, Jan. 16, 2016, 6 pages, European Patent Office, Munich, Germany.

(Continued)

*Primary Examiner* — Emmanuel M Marcelo
*Assistant Examiner* — Juan Campos, Jr.
(74) *Attorney, Agent, or Firm* — Polsinelli PC

(57) ABSTRACT

For load compensation, different kinds of elastomeric load compensators are placed at various locations on the crane for increased flexibility and for shock and vibration absorption. The elastomeric load compensators employ elastomeric tension elements, elastomeric torsion elements, or elastomeric shear elements. Elastomeric tension elements can be simply inserted in series with the main hoist rope. An elastomeric load compensator employing elastomeric torsion elements is mounted to the underside of the boom for receiving the live end of the main hoist rope. A single stack of elastomeric shear elements is suitable for mounting a hoist or winch or an idler sheave to the crane structure. For additional load compensation, the hoist, winch, and idler sheaves are mounted on rails for increased displacements under heave loads, and the increased displacements are compensated by elongated elastomeric tension elements or multiple elastomeric tension, torsion or shear elements in series.

20 Claims, 16 Drawing Sheets

(51) Int. Cl.

| | |
|---|---|
| *B66C 23/52* | (2006.01) |
| *B66D 1/50* | (2006.01) |
| *F16F 1/46* | (2006.01) |
| *F16F 1/48* | (2006.01) |
| *F16F 1/50* | (2006.01) |
| *F16F 1/54* | (2006.01) |
| *F16F 3/087* | (2006.01) |
| *B66C 13/04* | (2006.01) |
| *B66C 13/06* | (2006.01) |

(52) U.S. Cl.
CPC ............... *B66C 23/52* (2013.01); *B66D 1/50* (2013.01); *F16F 1/46* (2013.01); *F16F 1/48* (2013.01); *F16F 1/50* (2013.01); *F16F 1/54* (2013.01); *F16F 3/0876* (2013.01)

(56) References Cited

U.S. PATENT DOCUMENTS

| | | |
|---|---|---|
| 2,854,154 A | 9/1958 | Hepinstall |
| 2,903,208 A | 9/1959 | Everitt |
| 2,915,306 A | 12/1959 | Hickman |
| 2,946,466 A | 7/1960 | Weiner |
| 3,189,196 A | 6/1965 | Carl et al. |
| 3,306,600 A | 2/1967 | Roux et al. |
| 3,371,919 A | 3/1968 | Minor et al. |
| 3,388,070 A | 6/1968 | Born et al. |
| 3,401,972 A | 9/1968 | Walsh |
| 3,480,255 A | 11/1969 | Wiggins |
| 3,591,022 A | 7/1971 | Polyakov et al. |
| 3,991,837 A | 11/1976 | Crickmer |
| 4,025,055 A | 5/1977 | Strolenberg |
| 4,051,922 A | 10/1977 | Sukle |
| 4,076,284 A | 2/1978 | Herbert et al. |
| 4,168,781 A | 9/1979 | Bryan, Jr. |
| 4,180,171 A | 12/1979 | Cunningham et al. |
| 4,182,104 A | 1/1980 | Sukle |
| 4,236,695 A | 12/1980 | Morrison |
| 4,271,970 A | 6/1981 | Miller et al. |
| 4,348,015 A | 9/1982 | Domer |
| 4,354,608 A | 10/1982 | Wudtke |
| 4,428,568 A | 1/1984 | McNatt et al. |
| 4,544,137 A | 10/1985 | Johnson |
| 4,593,885 A | 6/1986 | Hackman et al. |
| 4,627,885 A | 12/1986 | Arlt |
| 4,892,444 A | 1/1990 | Moore |
| 4,957,279 A | 9/1990 | Thorn |
| 4,991,366 A | 2/1991 | Teramura et al. |
| 5,028,194 A | 7/1991 | Robinson |
| 5,054,963 A | 10/1991 | Williamsson |
| 5,101,905 A | 4/1992 | Arlt et al. |
| 5,209,302 A | 5/1993 | Robichaux et al. |
| 5,209,461 A | 5/1993 | Whightsil, Sr. |
| 5,259,597 A | 11/1993 | Fredheim |
| 5,268,404 A | 12/1993 | Mowrey |
| 5,299,790 A | 4/1994 | Whightsil, Sr. |
| 5,330,165 A | 7/1994 | van Goubergen |
| 5,366,324 A | 11/1994 | Arlt et al. |
| 5,421,468 A | 6/1995 | Wright |
| 5,433,423 A | 7/1995 | Whightsil, Sr. |
| 5,573,463 A | 11/1996 | Arlt |
| 5,613,665 A | 3/1997 | Lund |
| 5,641,248 A | 6/1997 | Arlt, III |
| 5,713,710 A | 2/1998 | Strong et al. |
| 5,772,188 A | 6/1998 | Lund |
| 5,842,312 A | 12/1998 | Krumme et al. |
| 5,862,638 A | 1/1999 | Holland et al. |
| 5,951,061 A | 9/1999 | Arlt, III et al. |
| 6,067,735 A | 5/2000 | Kallenberger |
| 6,082,947 A | 7/2000 | Adamson |
| 6,116,565 A | 9/2000 | Reinke et al. |
| 6,141,919 A | 11/2000 | Robinson |
| 6,174,587 B1 | 1/2001 | Figge, Sr. |
| 6,190,091 B1 | 2/2001 | Byle |
| 6,209,842 B1 | 4/2001 | Anderson et al. |
| 6,328,294 B1 | 12/2001 | Palinkas |
| 6,364,274 B1 | 4/2002 | Omi et al. |
| 6,382,603 B1 | 5/2002 | Monson et al. |
| 6,505,574 B1 | 1/2003 | Naud et al. |
| 6,926,467 B1 | 8/2005 | Andersen et al. |
| 6,932,325 B1 | 8/2005 | Selcer et al. |
| 6,932,326 B1 | 8/2005 | Krabbendam |
| 6,935,262 B2 | 8/2005 | Roodenburg et al. |
| 6,964,552 B1 | 11/2005 | Krabbendam |
| 7,097,169 B2 | 8/2006 | Mueller |
| 7,367,464 B1 | 5/2008 | Agostini et al. |
| 7,415,783 B2 | 8/2008 | Huffman et al. |
| 7,670,228 B2 | 3/2010 | Matsumoto et al. |
| 7,731,157 B2 | 6/2010 | Davidson |
| 7,798,471 B2 | 9/2010 | Christopher |
| 8,235,231 B2 | 8/2012 | Schneider et al. |
| 8,251,148 B2 | 8/2012 | von der Ohe |
| 8,265,811 B2 | 9/2012 | Kyllingstad |
| 8,297,597 B2 | 10/2012 | Dalsmo et al. |
| 2010/0308289 A1 | 12/2010 | Dalsmo et al. |
| 2010/0314168 A1 | 12/2010 | Williams |
| 2011/0100279 A1 | 5/2011 | Roodenburg et al. |
| 2011/0253661 A1 | 10/2011 | Smith et al. |
| 2011/0260126 A1 | 10/2011 | Willis |
| 2012/0025156 A1 | 2/2012 | Roodenburg et al. |
| 2012/0156003 A1 | 6/2012 | Battersby et al. |
| 2012/0217063 A1 | 8/2012 | Roodenburg et al. |

FOREIGN PATENT DOCUMENTS

| | | |
|---|---|---|
| FR | 2945982 A1 | 12/2010 |
| GB | 554989 A | 7/1943 |
| GB | 1058793 A1 | 2/1967 |
| GB | 2259747 A1 | 3/1993 |
| WO | WO8303814 A1 | 11/1983 |
| WO | 9627055 A1 | 9/1996 |
| WO | WO03083323 A1 | 10/2003 |
| WO | 2014151825 A1 | 9/2014 |

OTHER PUBLICATIONS

Offshore Pedestal-mounted Cranes, API Specification 2C, Seventh Edition, Mar. 1, 2012, pp. i-vii, 1, 61, 23-31 and 61, and ERRATA of Mar. 2013, one page, American Petroleum Institute, Washington, DC.

Specification for Offshore Pedestal Mounted Cranes, API Specification 2C, Sixth Edition, Mar. 2004, pp. 1-2, 11-13, American Petroleum Institute, Washington, DC.

Neupert, Jorg et al., A Heave Compensation Approach for Offshore Cranes, 2008 American Control Conference, Westin Seattle Hotel, Seattle, Washington, Jun. 11-13, 2008, pp. 538-543, American Automatic Control Council, Troy, NY.

Nautilus® Marine Cranes, Pedestal Cranes and Services, Brochure, 2006, 4 pages, Oil States Industries, Inc., Arlington, TX.

The Cranemaster calculation sheet, 2006, Jan. 31, 2013, three pages, Crane and Rig Inc, Nisku, Alberta, Canada.

Rupcic, Zoran, International Search Report and Written Opinion of the International Searching Authority, International application No. PCT/US2014/026515, Aug. 8, 2014, 15 pages, International Searching Authority, European Patent Office, Rijswijk, Netherlands.

Ross, Kenneth, Invitation to Pay Additional Fees and, Where Applicable, Protest Fee, International application No. PCT/US2014/026515, Jun. 27, 2014, 6 pages, International Searching Authority, European Patent Office, Rijswijk, Netherlands.

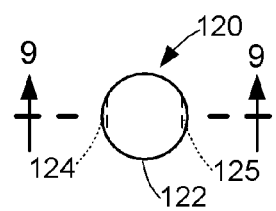
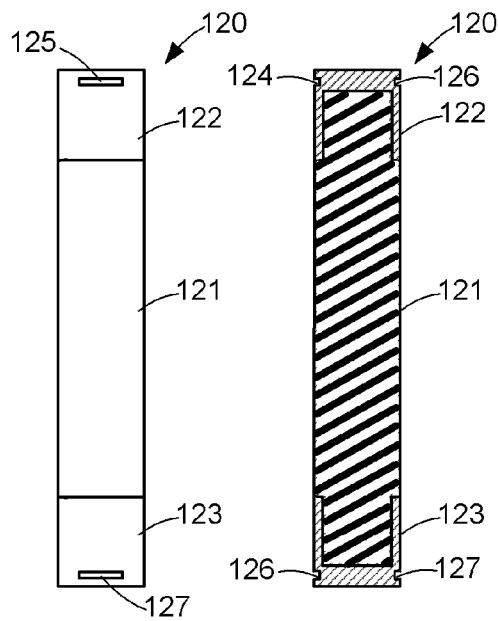
FIG. 8
FIG. 7    FIG. 9
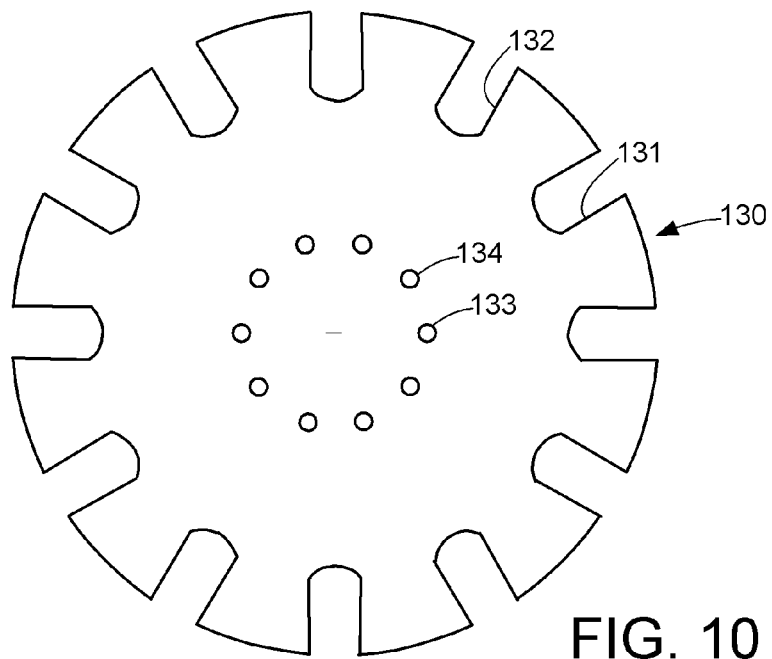
FIG. 10

ELASTOMERIC LOAD COMPENSATORS FOR LOAD COMPENSATION OF CRANES

RELATED APPLICATIONS

The present application claims the benefit of Walter Billiot et al. U.S. Provisional Application Ser. 61/800,781 filed Mar. 15, 2013.

FIELD OF THE INVENTION

The present invention relates to elastomeric springs, and load compensation of cranes.

BACKGROUND OF THE INVENTION

Elastomeric springs have been used in a number of applications to provide an opposing force of compression, torsion, or tension, in response to an applied displacement. The amount of opposing force provided by the elastomeric spring in response to a unit of displacement is known as the spring rate. Elastomeric springs have also been designed to put the elastomer of the spring in tension, shear, or compression in response to the applied displacement. By selecting whether the elastomer is put in tension, shear, or compression, elastomeric springs have been designed for rather linear spring rates and for non-linear spring rates. For example, compression of the elastomer typically results in a non-linear spring rate having a progressive increase in restoring force per unit of displacement as the elastomer is compressed.

Some examples of applications using elastomeric springs include exercise equipment (Whightsil, Sr. U.S. Pat. No. 5,209,461), drive-line couplings (Arlt U.S. Pat. Nos. 4,627,885 and 5,753,463), energy absorbers (Robinson U.S. Pat. No. 6,141,919), flexible pipe joints (Herbert et al. U.S. Pat. No. 4,076,284), and riser tensioner systems (Arlt et al. U.S. Pat. Nos. 5,366,324 and 5,641,248).

Offshore cranes are subject to load variations when making an off-board lift of a payload from a floating vessel such as a supply vessel or materials barge. Severe sea conditions cause heave motion of the floating vessel, and have the effect of placing a transient load upon the crane in excess of the weight of the payload when the payload is lifted off the floating vessel.

Severe sea conditions are considered in industry standards for offshore cranes. For example, the American Petroleum Institute Specification for Offshore Pedestal Mounted Cranes, API-2C, Seventh Edition, March 2012, requires the crane manufacturer to account for sea conditions by using a Dynamic Factor (Cv). The crane capacity for off-board lifts must be de-rated by the Cv. The minimum Cv allowed by the API-2C specification is 1.4 for cranes installed on floating applications and 1.33 for cranes installed on fixed structures. In some cases, Cv will range from 2 to 4. For example, a Cv of 2.8 means that the crane lifting capability at a particular radius from the pedestal mount is one-half of what it could be at the API-2C minimum for the same radius. The Cv is calculated at spaced radii over the range of radii for the crane, and it is a function of three variables. The first variable is a "significant wave height" specified by the customer for the particular marine environment that the crane is designed to operate in. An increase in the "significant wave height" has the effect of raising Cv and reducing the safe working load of the crane. The second variable is the crane geometry. The third variable is crane stiffness taking into account all elements from the hook through the pedestal structure. See, for example, FIG. 8 on page 61 of the API-2C specification, and Section 5.4 on pages 23-31 of the API-2C specification.

Heave compensation of a crane is a method of compensating for the load variations due to heave motion of the crane or the support from which the crane is lifting the payload. Heave compensation attempts to reduce the load variations by raising or lowering the payload to counteract the effect of the heave motions. For example, the objective is for the payload to track a desired reference trajectory in an earth fixed frame without being influenced by heave motions. Heave compensation has employed passive components, active components, and combinations of active and passive components. The passive components have included springs and counter-weights that react to an increase in loading from the payload by reducing the payload acceleration, so that the crane tends to apply a more constant lifting force upon the payload. The active components have included sensors that measure motion of the crane, the payload, or its support, and hydraulic cylinders or winch motors that are actuated in response to the sensor signals in order to counteract the effect of the heave motion. See, for example, Jorg Neupert et al., A Heave Compensation Approach for Offshore Cranes, 2008 American Control Conference, Westin Seattle Hotel, Seattle, Wash., Jun. 11-13, 2008, pages 538-543, American Automatic Control Council, Troy, N.Y.

One kind of passive heave compensator that has been used in the industry has hydraulic or gas cylinders attached to a load block between the hook of the crane and the payload in order to limit dynamic loads. See, for example, Hackman et al. U.S. Pat. No. 4,593,885.

SUMMARY OF THE DISCLOSURE

The present disclosure describes elastomeric load compensators for load compensation of a crane. The elastomeric load compensators are compact, convenient, reliable, and relatively lightweight mechanisms for load compensation in comparison to the mechanical spring, counterweight, and hydraulic mechanism that have been used for crane heave compensation. The elastomeric load compensators are configured for placement at one or more locations on the crane, and may provide rather linear or progressive spring rates and shock and vibration absorption as appropriate for the particular location of the load compensator.

The elastomeric load compensators reduce the crane stiffness and reduce the Dynamic Factor (Cv) in such a way as to significantly increase the off-board crane load ratings for a given crane model. In most cases, this allows for the use of a smaller crane model for a given customer or project requirement. The smaller crane model has lower design requirements for the crane pedestal support structure, which is a significant consideration in the platform design for the customer. This reduces the platform construction costs for the customer. The production costs for the smaller crane model are also lower. In most cases, there is an average cost difference of approximately ten percent between models. The elastomeric load compensators may reduce the appropriate model size by one to three models, depending on the requirements, for an average reduced production cost of ten to thirty percent.

In accordance with a basic aspect, the present disclosure describes a crane including a base, a boom mounted to the base, a hoist rope descending from the boom for attachment to a payload, and a host mechanism mounted to at least one of the base and the boom for applying tension to the hoist rope to lift the payload. The crane has a stiffness from the payload to the base. The crane further includes an elastomeric load compensator coupled between the payload and the base for reducing the stiffness of the crane.

In accordance with another aspect, the present disclosure describes an elastomeric load compensator including elongated elastomeric tension elements. Each of the elongated elastomeric tension elements includes an elastomer body and a pair of end caps made of rigid material, such as metal or composite, bonded to ends of the elastomer body. The elastomeric load compensator further includes a pair of end plates of rigid material, such as metal or composite, for applying tension to the elongated elastomeric tension elements. The pair of end plates mechanically connects the elongated elastomeric tension elements in parallel with respect to the applied tension.

In accordance with yet another aspect, the present disclosure describes an elastomeric load compensator including a frame, a shaft mounted to the frame, and a sheave mounted to the shaft for rotation about the shaft to dispense and retract a rope. The elastomeric load compensator further includes a stack of elastomeric torsion elements mechanically connected in series between the sheave and the frame to resist the dispensing of the rope and to enhance the retraction of the rope.

In accordance with still another aspect, the present disclosure describes an elastomeric load compensator including first and second rigid plates and a stack of elastomeric layers disposed between and bonded to the first and second rigid plates, and a pair of parallel spaced retaining brackets. The stack of elastomeric layers is disposed between the retaining brackets so that the retaining brackets retain the pair of rigid plates and the stack of elastomeric layers against separation of the first and second rigid plates from the stack of elastomeric layers.

BRIEF DESCRIPTION OF THE DRAWINGS

Additional features and advantages of the present disclosure will be described below with reference to the drawings, in which:

FIG. 7 is a side view of an elastomeric tension element used in the first kind of elastomeric load compensator;

FIG. 8 is a top view of the elastomeric tension element;

FIG. 9 is a longitudinal section of the elastomeric tension element along section line 9-9 in FIG. 8;

FIG. 10 is a top view of a slotted disk used in the first kind of elastomeric load compensator for receiving a circular array of elastomeric tension elements;

Figure 1:
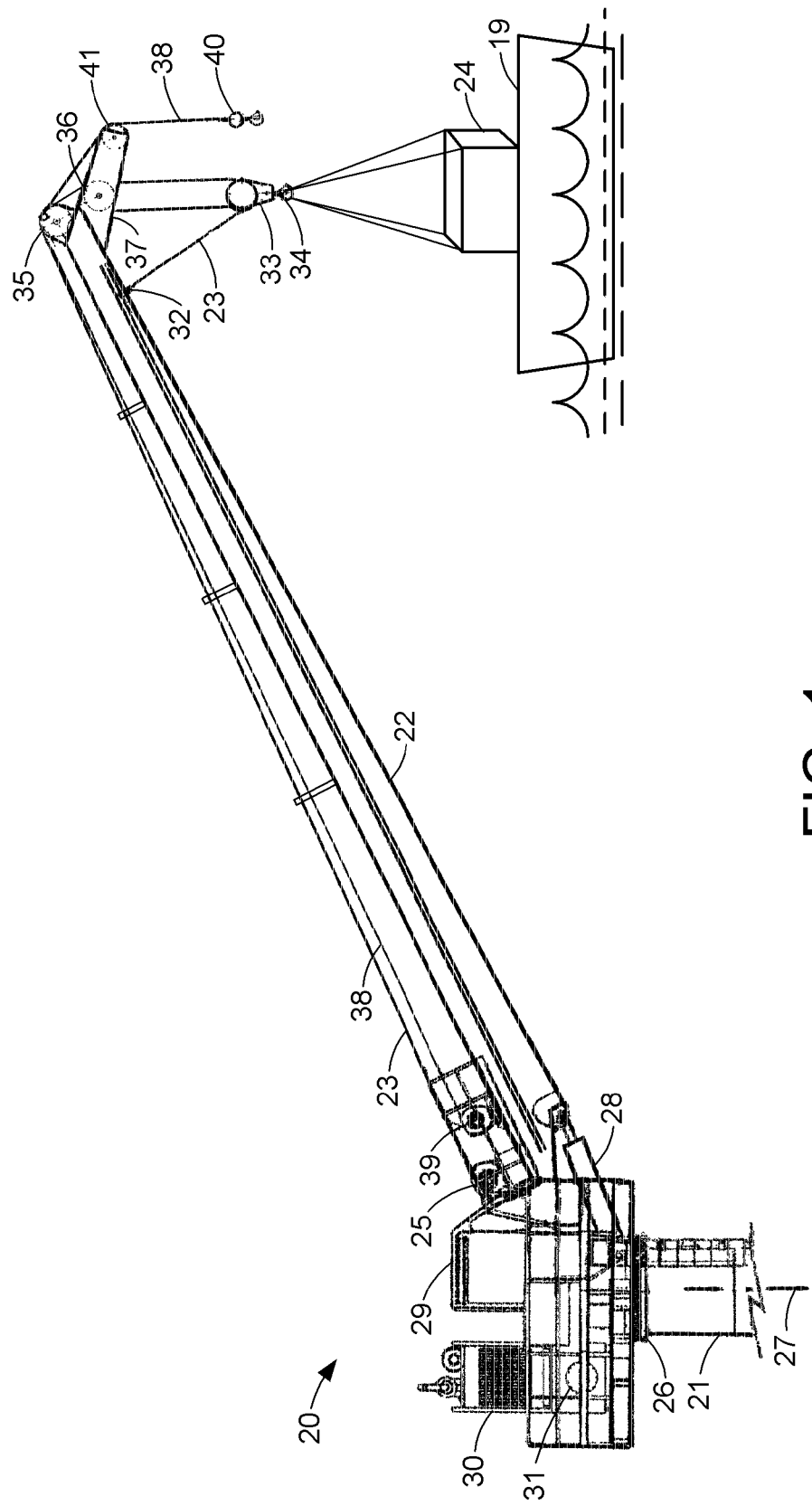
FIG. 1 is a side view of a conventional pedestal-mounted offshore crane having a box-frame boom.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

FIG. 1 shows a first kind of offshore crane 20 that is susceptible to heave loads when performing an off-board lift of a payload 24 from a floating vessel 19. In general, the crane 20 has a base 21, a boom 22 mounted to the base 21, a hoist rope 23 descending from the boom for attachment to the payload 24, and a hoist mechanism 25 mounted to the base 21 or to the boom 22 for applying tension to the hoist rope 23 to lift the payload 24.

In particular, the crane 20 is a pedestal-mounted offshore crane having a box-frame boom 22. A specific example of such a crane is a NAUTILUS® brand of pedestal marine crane Model 180B-70 sold by Oil States Industries, Inc. of Arlington, Tex. The base 21 is a cylindrical pedestal, and the boom 22 is mounted to the pedestal via a swing-circle assembly 26. The swing circle assembly 26 rotates the boom 22 about a central vertical axis 27 of the pedestal 21. In addition, the boom 22 is pivotally mounted to the swing-circle assembly 26 so that a pair of 12 inch (30.5 centimeter) diameter hydraulic cylinders 28 may erect the boom 22 to a desired angle of inclination. For example, at a zero angle of inclination, the boom 22 is horizontal and provides a radius of seventy feet (21 meters) from the pedestal axis 27 to a main hook 34. In this fashion, the jib 37 is positioned over a first location to pick up the payload 24, and then positioned over a second location to drop off the payload.

The swing-circle assembly 26 also carries an operator's cab 29, a diesel engine 30, and a hydraulic pump 31 driven by the diesel engine. The hydraulic pump 31 powers the swing-circle assembly 26, the hydraulic cylinders 28, the hoist mechanism 25, and an auxiliary hoist mechanism 39.

In the crane 20, the hoist rope 23 is a main hoist wire rope, and the hoist mechanism 25 is a main hoist winch. A live end of the main hoist wire rope 23 is secured to the main hoist winch 25, which draws in the main hoist wire rope 23 to lift the payload 24. A dead end 32 of the main hoist wire rope 23 is secured to the boom 22. A hoist block 33 carrying the main hook 34 attaches the main hoist wire rope 23 to the payload 24. For example, the hoist block 33 provides a maximum lift of 25 short tons (22.7 metric tons). The main hoist wire rope 23 runs over a boom point sheave assembly 35 and over a sheave assembly 36 in a jib 37 extending from the boom 22. The combination of the sheave assembly 36 and the hoist block 33 organizes the main hoist wire rope 23 into a four part reeving so that the tension on the main hoist wire rope 23 is about one-quarter of the tension applied on the main hook 34 from the payload 24.

The crane 20 also has an auxiliary hoist wire rope 38. A live end of the auxiliary hoist wire rope 38 is secured to an auxiliary hoist winch 39 mounted to the boom 22. A dead end of the auxiliary hoist wire rope 38 is secured to an overhaul ball 40. The auxiliary hoist wire rope 38 runs over the boom point sheave assembly 35 and over a sheave 41 at the distal end of the jib 37.

Figure 2:
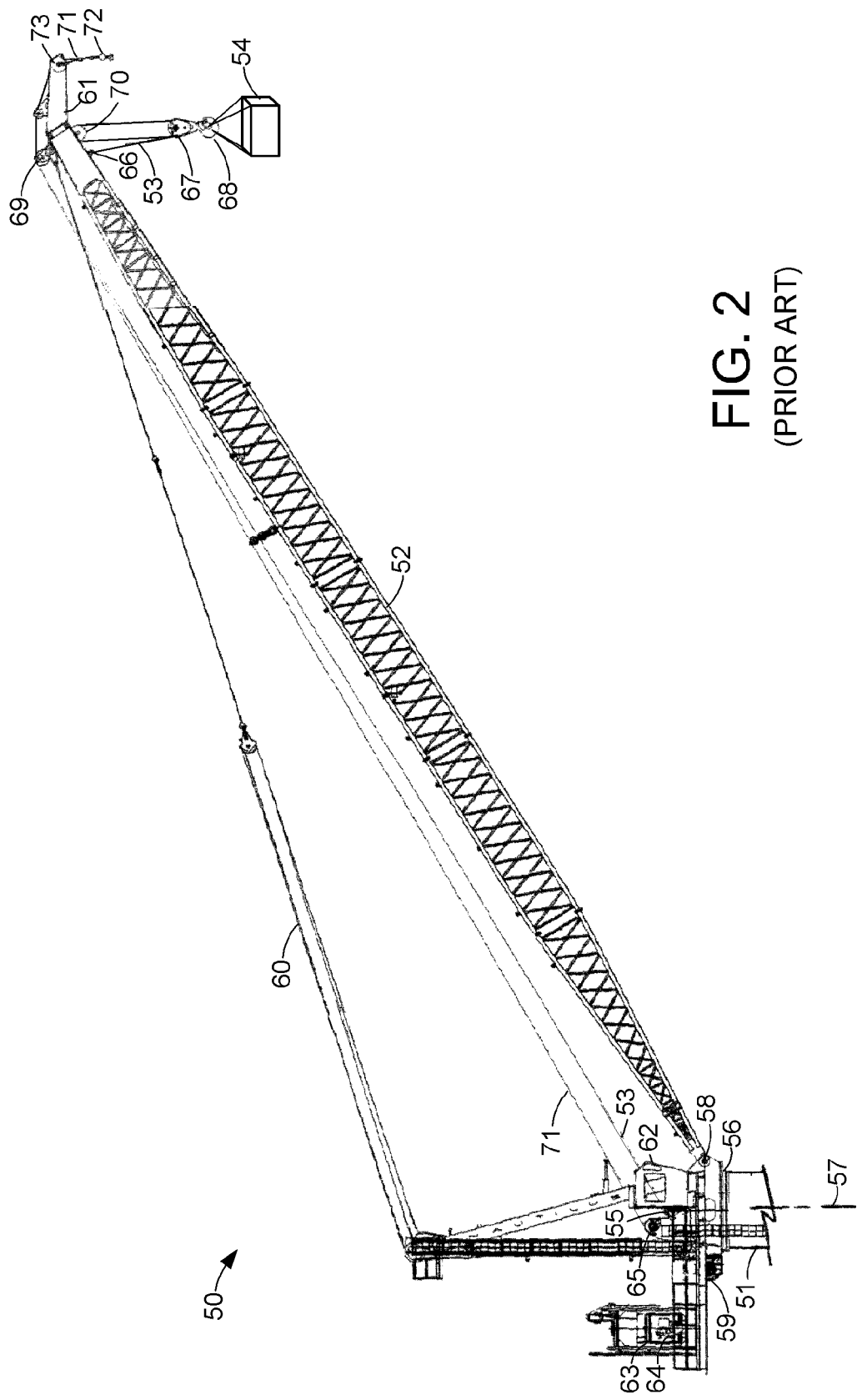
FIG. 2 is a side view of a conventional pedestal-mounted offshore crane having a lattice-frame boom.

FIG. 2 shows a second kind of offshore crane 50 that also is susceptible to heave loads when performing an off-board lift. In general, the crane 50 has a base 51, a boom 52 mounted to the base 51, a hoist rope 53 descending from the boom for attachment to a payload 54, and a hoist mechanism 55 mounted to the base 51 for applying tension to the hoist rope 53 to lift the payload 54.

In particular, the crane 50 is a pedestal-mounted offshore crane having a lattice-frame boom 52. A specific example of such a crane is a NAUTILUS® brand of pedestal marine crane Model 1400L.5-170 sold by Oil States Industries, Inc. of Arlington, Tex. The lattice frame of the boom 52 is efficient for the large size of the crane 50. The base 51 is a cylindrical pedestal, and the boom 52 is mounted to the pedestal via a swing-circle assembly 56. The swing circle assembly 56 rotates the boom 52 about a central vertical axis 57 of the pedestal 51. In addition, a heel pin 58 pivotally mounts the boom 52 to the swing-circle assembly 56 so that a boom hoist winch 59 may erect the boom 52 to a desired angle of inclination. For example, at a zero angle of inclination, the boom 52 is horizontal and provides a radius of 177 feet (54 meters) from the pedestal axis 57 to a main hook 68. The boom hoist winch 59 reels in a boom hoist wire rope 60 to raise the boom 52. In this fashion, a jib 61 extending from the boom 52 is positioned over a first location to pick up the payload 54, and then positioned over a second location to drop off the payload.

The swing-circle assembly 56 also carries an operator's cab 62, a diesel engine 63, and a hydraulic pump 64 driven by the diesel engine. The hydraulic pump 64 powers the swing-circle assembly 56, the hoist mechanism 55, the boom host winch 59, and an auxiliary hoist mechanism 65.

In the crane 50, the hoist rope 53 is a main hoist wire rope, and the hoist mechanism 55 is a main hoist winch. A live end of the main hoist wire rope 53 is secured to the main hoist winch 55, which draws in the main hoist wire rope 53 to lift the payload 54. A dead end 66 of the main hoist wire rope 53 is secured to the boom 52. A hoist block 67 carrying the main hook 68 attaches the main hoist wire rope 53 to the payload 54. For example, the hoist block 67 provides a maximum lift of 50 short tons (45.4 metric tons). The main hoist wire rope 53 runs over a boom point sheave assembly 69 and over a sheave assembly 70. The combination of the sheave assembly 70 and the hoist block 67 organizes the main hoist wire rope 53 into a four part reeving so that the tension on the main hoist wire rope 53 is about one-quarter of the tension applied on the main hook 68 from the payload 54.

The crane 50 also has an auxiliary hoist wire rope 71. A live end of the auxiliary hoist wire rope 71 is secured to an auxiliary hoist winch 65 mounted to the base 51. A dead end of the auxiliary hoist wire rope 71 is secured to an overhaul ball 72. The auxiliary hoist wire rope 71 runs over the boom point sheave assembly 69 and over a sheave 73 at the distal end of the jib 61.

It is desired to use elastomeric load compensators for load compensation of a crane, such as a crane of the kind shown in FIG. 1 or FIG. 2. The load compensators may handle the (sometimes very high) liftoff velocity required to avoid payload re-contact with the deck of the floating vessel, as well as provide compensation for deck heave. The re-contact scenario involves the deck moving down at the moment the payload is picked up off of the deck. The payload then has a certain amount of time to get out of the way before the deck comes back and hits it. This time allowance dictates a hoisting velocity. The elastomeric load compensators of the present disclosure have been designed to resist the "impact" from the upward-moving hook meeting the downward-moving payload, rather than typical heave applications, where load re-contact is not such a concern.

The heave compensation reduces the crane stiffness and reduce the Dynamic Factor (Cv) in such a way as to significantly increase the off-board crane load ratings for a given crane model. In most cases, this allows for the use of a smaller crane model for a given customer or project requirement. The smaller crane model has lower design requirements for the crane support structure, which is a significant consideration in the platform design for the customer. This reduces the platform construction costs for the customer.

Elastomeric load compensators are compact, convenient, reliable, and relatively lightweight mechanisms for load compensation in comparison to the mechanical spring, counterweight, and hydraulic mechanism that have been used for crane heave compensation. The elastomeric load compensators described below are configured for placement at one or more locations on the crane, and may provide more or less linear or progressive spring rates and shock and vibration absorption as appropriate for the particular location of the load compensator.

The elastomeric load compensators can be added when needed to an existing offshore crane already installed on an offshore platform, or they can be added in anticipation of occurrences when they would be needed, or they can be added when an offshore crane is installed on an offshore platform, or they can be added on-shore to crane components when the crane components are manufactured.

Different kinds of elastomeric load compensators have been devised for addition to particular crane components and locations on the crane structure. The different kinds of elastomeric load compensators have different geometries and configurations most suitable for mounting to the particular crane components and locations. Therefore, at any given time in the life cycle of the crane, the particular kind of elastomeric load compensator can be selected that is most convenient for installation to obtain a desired degree of reduction in the Dynamic Factor (Cv).

To obtain the highest degree of reduction in Cv, it is advantageous to use a combination of the different kinds of elastomeric load compensators on a single crane. This avoids the use of a relatively large elastomeric load compensator that could add a significant additional load upon the crane. On the other hand, the quickest way of adding an elastomeric load compensator to an existing offshore crane already installed on an offshore platform is to add the elastomeric load compensator at the most convenient location, below the boom near the main hook. This most convenient location, however, has the effect of reducing the maximum static load at maximum radius from the pedestal axis by the weight of the elastomeric load compensator.

Figure 3:
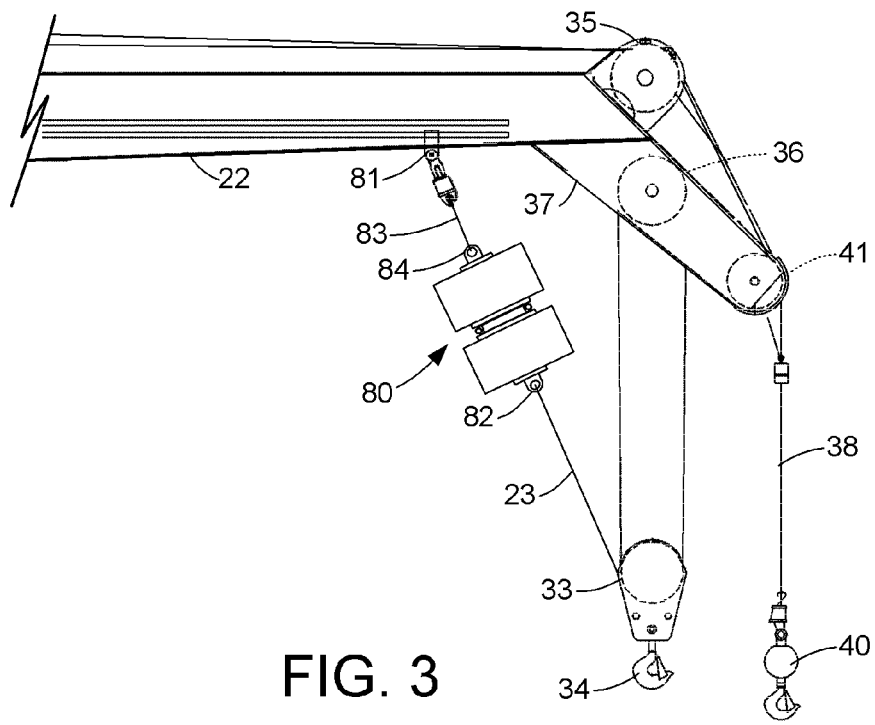
FIG. 3 shows a first kind of elastomeric load compensator installed in the crane of FIG. 1 between the boom and a dead end of a main hoist rope.

FIG. 3 shows an elastomeric load compensator 80 configured for quick mounting and dismounting from an offshore crane. In the example of FIG. 3, the elastomeric load compensator 80 has been mounted to the crane 20 of FIG. 1, although a similar elastomeric load compensator can be just as easily mounted in the same way to the crane 50 of FIG. 2.

As shown in FIG. 3, the dead end 32 of the main hoist wire rope 23 has been removed from a load cell mount 81 on the underside of the boom 22 and attached to a first steel eyelet 82 of the elastomeric load compensator 80. A link 83 has been added to attach a second steel eyelet 84 of the elastomeric load compensator 80 to the load cell mount 81. Therefore tension in the main hoist wire rope 23 is applied to the elastomeric load compensator 80, and the elastomeric load compensator reacts to the applied tension by elongating so that the distance between the first eyelet 82 and the second eyelet 84 increases in proportion to the applied tension. This elongation in proportion to the applied tension tends to keep the tension in the main hoist wire rope 23 more constant when heave loads are applied. The overall effect of the elastomeric load compensator 80 is to provide passive heave compensation by reducing the crane stiffness from the main hook 34 through the pedestal structure.

For example, the elastomeric load compensator 80 has a spring rate of 450 pounds force per inch (788 Newtons/cm), a maximum extension of 38.7 inches (98.3 cm) for a maximum rated tension of 17.4 kips (77.4 kilo Newtons), an outer diameter of 17.75 inches (45.1 cm), and a length of about 22 inches (56 cm) in the absence of applied tension.

Figure 4A:
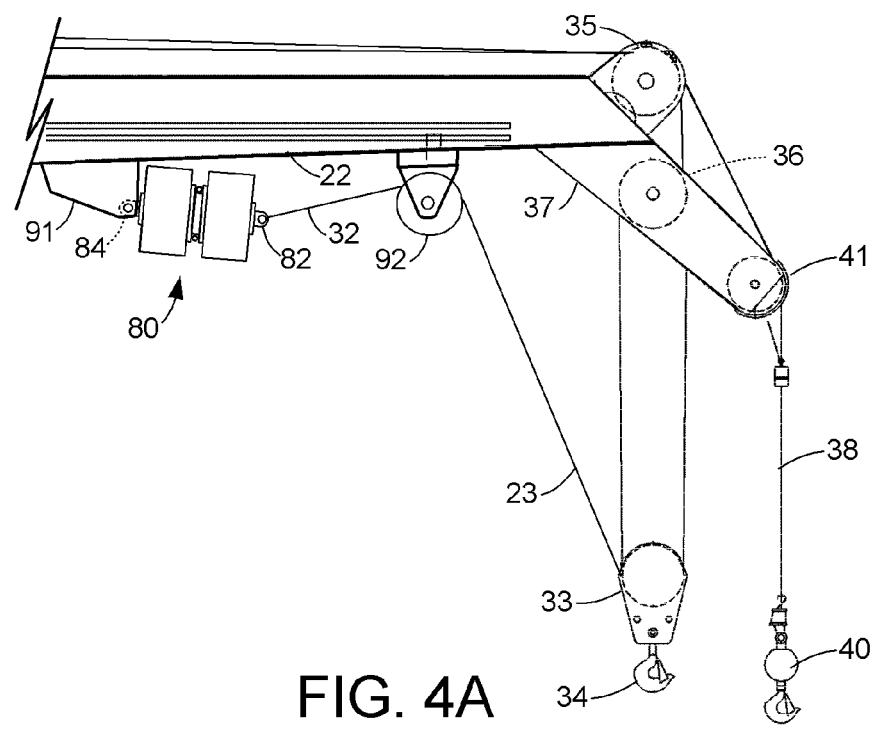
FIG. 4A shows a more permanent mounting of the first kind of elastomeric load compensator under the boom of the crane of FIG. 1.

FIG. 4A shows a more permanent mounting of the elastomeric load compensator 80 to the boom 22. A bracket 91 is welded or bolted to the underside of the boom 22, and the second eyelet 84 of the elastomeric load compensator is pinned to the bracket 91. An idler sheave 92 is secured to the underside of the boom 22 at the original attachment location (in FIG. 3) of the dead end 32 of the main hoist wire rope 23. The main hoist wire rope 23 is strung over the idler sheave 92, and again the dead end 32 of the main hoist wire rope 23 is attached to the first eyelet 82 of the elastomeric load compensator 80.

The assembly in FIG. 4A has a number of advantages over the configuration in FIG. 3. In FIG. 4A, the elastomeric load compensator 80 is mounted at a smaller radius from the pedestal axis (27 in FIG. 1) so that maximum static load of the crane is reduced less by the weight of the elastomeric load compensator 80. In FIG. 4A, the length of the elastomeric load compensator 80 does not reduce the appropriate minimum distance of the hook 34 from the jib 37. In addition, the amount of space between the first mounting eyelet 82 and the sheave 92 provides a visual indication to persons near the crane of available capacity of the elastomeric load compensator for absorbing heave loads.

Figure 4B:
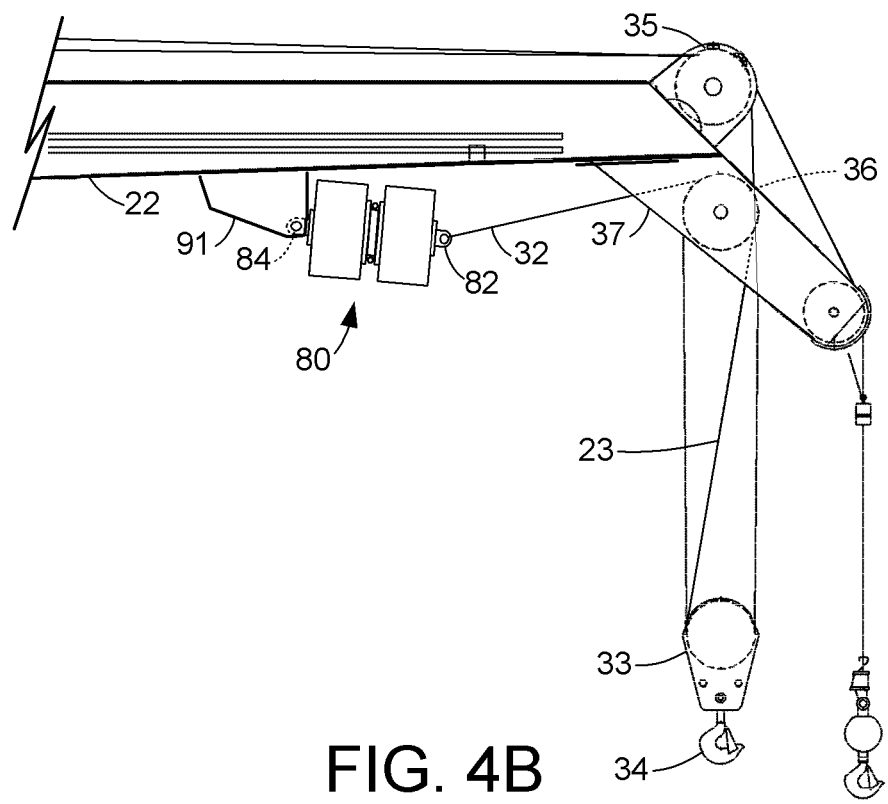
FIG. 4B shows an alternative way of using the first kind of elastomeric load compensator mounted under the boom of the crane of FIG. 1.

FIG. 4B shows an alternative way of using the first kind of elastomeric load compensator 80 mounted under the boom 22. In this example, the sheave 92 of FIG. 4A has been eliminated. Instead, the main hoist wire rope 23 loops back over the sheave assembly 36, and from the sheave assembly 36, the dead-end of the main hoist wire rope is attached to the first eyelet of the elastomeric load compensator 80.

The different ways of using the first kind of elastomeric load compensator as shown in FIGS. 3, 4A and 4B all have the device in line with a single part of main hoist wire rope 23. This is in contrast to a load compensator that would be inserted between the hook 34 and a payload. The in-line mounting as shown in FIGS. 3, 4A and 4B is more convenient for customers, and is more challenging to implement with a conventional load compensator such as one using a gas cylinder. The in-line mounting does not leave a device hanging in the way of the people trying to rig the load to the crane hook. The in-line mounting does not limit the hook drop height of the crane. In-line mounting is more challenging for non-elastomeric devices because in-line mounting requires much more flexibility than hook mounting because the in-line mounting has more mechanical advantage since it acts on fewer parts of line. Due to the mechanical advantage, less required force is put on the load compensator, but the load compensator provides more travel or displacement.

Gas cylinders do not deal well with large displacements because their force versus displacement response is not linear. This is due to the fact that adiabatic but non-reversible gas cylinder expansion/compression follows a polytropic pressure vs. volume curve: $P_1 V_1^n = P_2 V_2^n$, where V=Area*Length. Thus $P_2 = P_1 (V_1/V_2)^n = P_1 (L_1/L_2)^n$, where $L_2$ is actually $L_1$+displacement. The exponent n is a number somewhere between 1.1 and 2. Therefore this results in a non-linear force response. In comparison, the elastomer response for elongation is much more linear. Because a gas cylinder does not have linear force vs. displacement, it is much more difficult for the manufacturer to create an inline device with ratings that conform to the API 2C standard, because the standard only accounts for linear (spring-like) behavior in the official formula for Cv. Cv=1+Vr Sqrt[k/g/SWLH]−k is the effective composite vertical stiffness of everything between the payload and the earth. The standard has no concept of the non-linear response of the gas-cylinder type devices.

Figure 5:
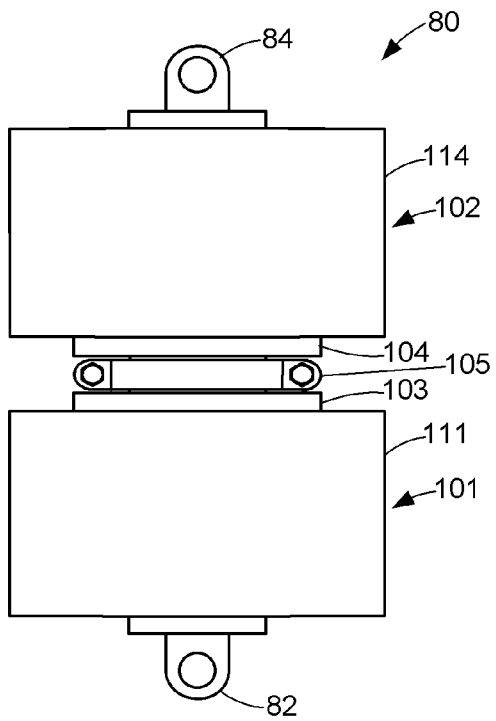
FIG. 5 is a front view of the first kind of elastomeric load compensator in the absence of applied tension.

FIG. 5 shows further details of the elastomeric load compensator 80 in the absence of applied tension. The elastomeric load compensator includes two identical cylindrical sections 101 and 102 that are stacked one upon the other. The first eyelet 82 is secured to the first section 101, for example by welding, bolts, or rivets. The second eyelet 84 is secured to the second section 102. To fasten the two sections 101 and 102 to each other, a first steel flange 103 is secured to the first section 101, and a second steel flange 104 is secured to the second section, and a split clamp 105 secures the first flange 103 to the second flange 104. In a similar fashion, additional sections could be inserted between the first section 101 and the second section 102 and clamped together in order to increase the length and maximum elongation of the elastomeric load compensator 80.

Figure 6:
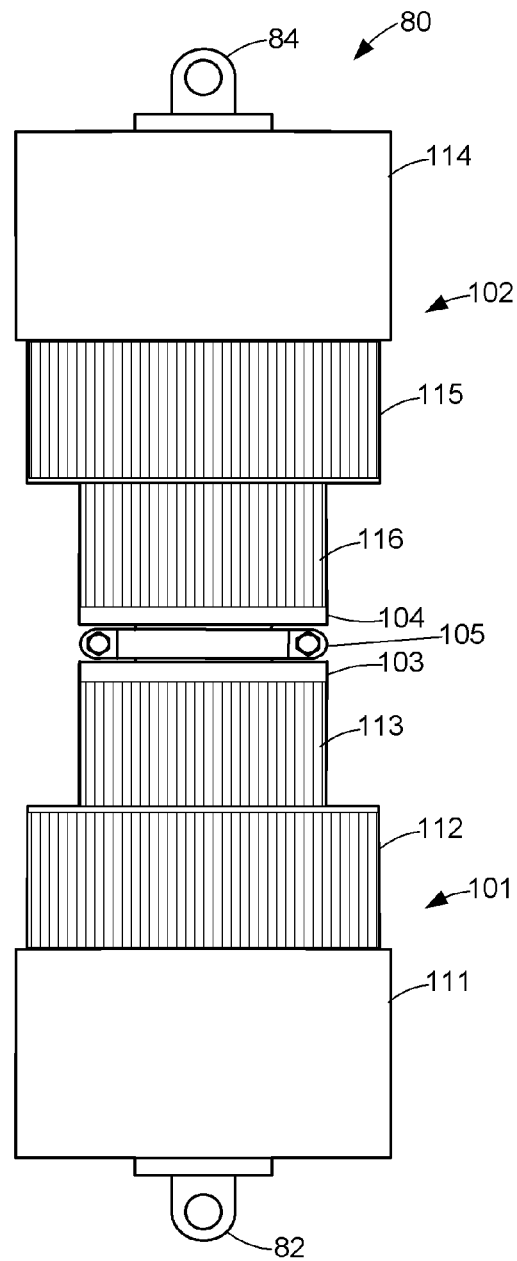
FIG. 6 shows a front view of the first kind of elastomeric load compensator in the presence of a maximum rated level of applied tension.

FIG. 6 shows the elastomeric load compensator 80 under the maximum rated tension. The tension has exposed telescoping cylindrical housings of each section. The telescoping cylindrical housings minimize exposure of the enclosed elastomeric tension elements to sunlight. The first section 101 has an outer housing 111, a first inner housing 112, and a second inner housing 113. The second section 102 also has an outer housing 114, a first inner housing 115, and a second inner housing 116. In contrast to the outer housings 111, 114, which have the color of the boom 22 such as white or yellow, the inner housings have a contrasting color such as red so that the degree of elongation of the elastomeric load compensator 80 in response to applied tension is clearly visible to persons near the crane. The contrasting color of an inner housing 112, 113, 115, 116 that remains visible in the absence of applied tension indicates that the elastomeric load compensator 80 has not retracted in the desired fashion. Therefore the elastomeric load compensator 80 should be repaired by replacement of the indicated section.

For example, the inner housings 112, 113, 115, 116 are provided with the contrasting color by colored paint or enamel applied to the outer surface of the inner housings after the outer surfaces of the inner housings has been washed and sand-blasted. The outer surfaces can be sand-blasted through a mask or grooved with a grinder to provide slightly indented longitudinal striped regions to which the paint or enamel will adhere without being scraped off due to the telescoping movement of the housings when tension is applied to the load compensator.

Each section 101, 102 of the elastomeric load compensator includes a number of elastomeric tension elements. A single elastomeric tension element 120 is shown in FIGS. 7, 8, and 9. The elastomeric tension element 120 is elongated and cylindrical. The elastomeric tension element 120 is comprised of an elastomer body 121 and metal, composite or plastic end caps 122 and 123. Each end cap 122, 123 has a respective cavity filled with elastomer of the body so that the end cap is bonded to the elastomer of the body.

The elastomeric tension element 120 is made by an injection molding process in which the internal surfaces of the end caps are coated with an epoxy rubber-to-metal or composite bonding agent, the end caps are inserted into ends of a mold having a conforming cylindrical cavity, elastomer mixed with a vulcanizing agent is injected into the mold, and the elastomer is cured under heat and pressure. The elastomer, for example, is natural or nitrile butadiene rubber, and the vulcanizing agent is sulfur. A suitable metal-to-rubber bonding agent, for example, is Chemlock 205/TY-PLY-BN produced by Lord Corporation, 2000 W. Grandview Blvd., P.O. Box 10038, Erie, Pa. See Mowrey U.S. Pat. No. 5,268,404. Another suitable bonding agent is Thixon P-6-EF primer and 532-EF adhesive produced by Rohm and Haas Company, 100 Independence Mall West, Philadelphia, Pa. 19106.

For applying tension to the tension element 120, the end caps 122, 123 are provided with peripheral grooves 124, 125, 126, 127 configured for engagement with slotted disks, rings or rails. For example, FIG. 10 shows a slotted steel disk 130 having slots 131, 132, etc. for receiving the end caps of a circular array of the tension elements. The slotted disk 130 also has a central array of holes 133, 134, etc. for receiving fasteners for securing the slotted disk 130 to an eyelet or flange.

Figure 11:
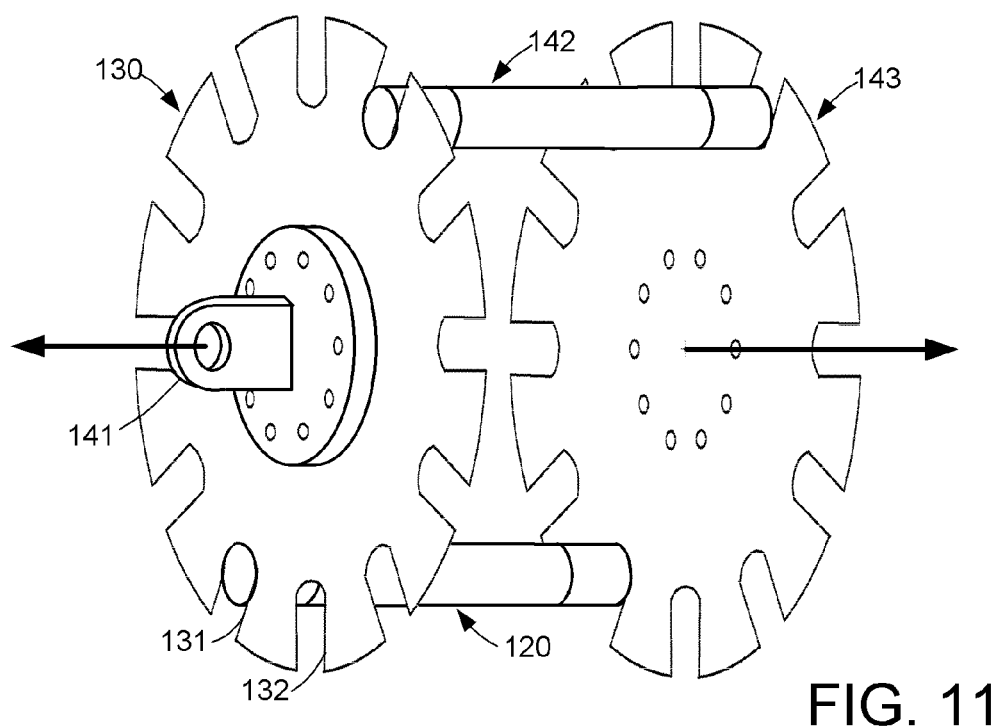
FIG. 11 is an oblique view showing generally how the slotted disk of FIG. 10 is used for receiving the elastomeric tension elements to construct the first kind of elastomeric load compensator.

For example, as shown in FIG. 11, an eyelet 141 is fastened to the slotted disk 130, and the end caps of a pair of elastomeric tension elements 120, 142 have been received in the slotted disk 130. A second slotted disk 143 is aligned in a coaxial fashion with the first slotted disk 130 to receive opposite end caps of the elastomeric tension elements 120, 142. Therefore the elastomeric tension elements 120, 142 become extended when tension is applied to the slotted disks in the axial direction to pull the two slotted disks away from each other.

In practice, a respective elastomeric extension element is received in each slot of each slotted disk so that each slotted disk carries a circular array of elastomeric extension elements. In effect, the elastomeric tension elements 120, 142 in the array are connected mechanically in parallel to the pair of slotted disks 130, 143, so that each elastomeric tension element in the array shares the same displacement. In each section 101, 102 of the elastomeric load compensator 80, two such arrays are connected mechanically in series to increase the maximum displacement of the elastomeric load compensator, and decrease the stiffness of the arrangement and crane. The two arrays have different diameters so that one array is nested inside the other to reduce the physical length of each section in the absence of applied tension.

Figure 12:
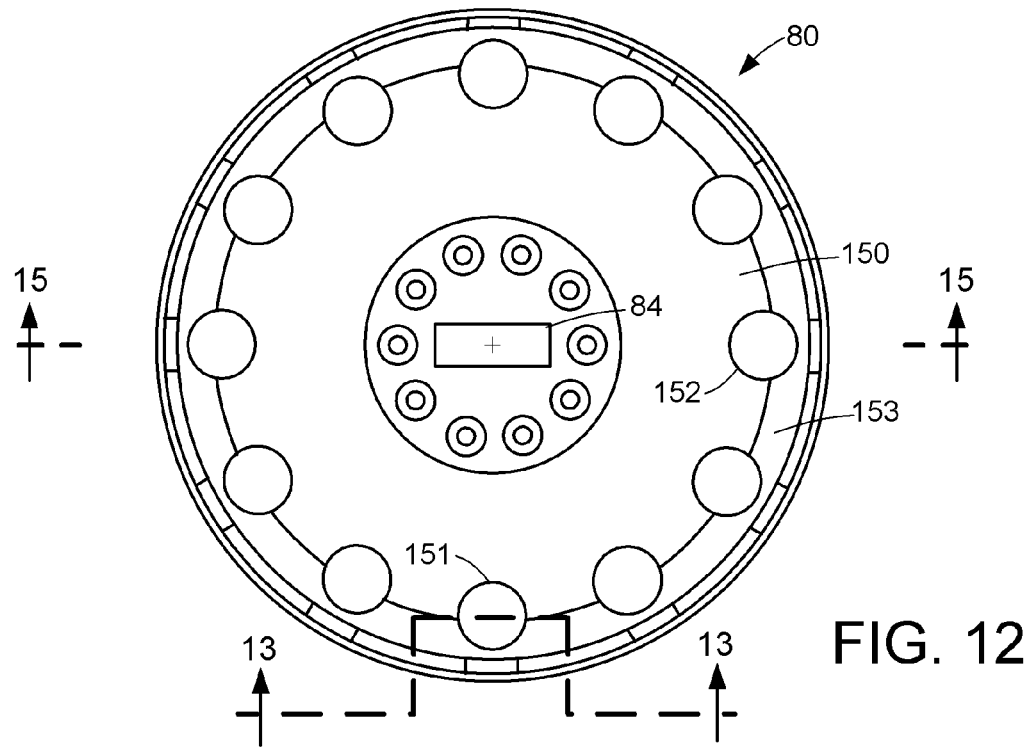
FIG. 12 is a top view of the first kind of elastomeric load compensator of FIG. 5.
Figure 13:
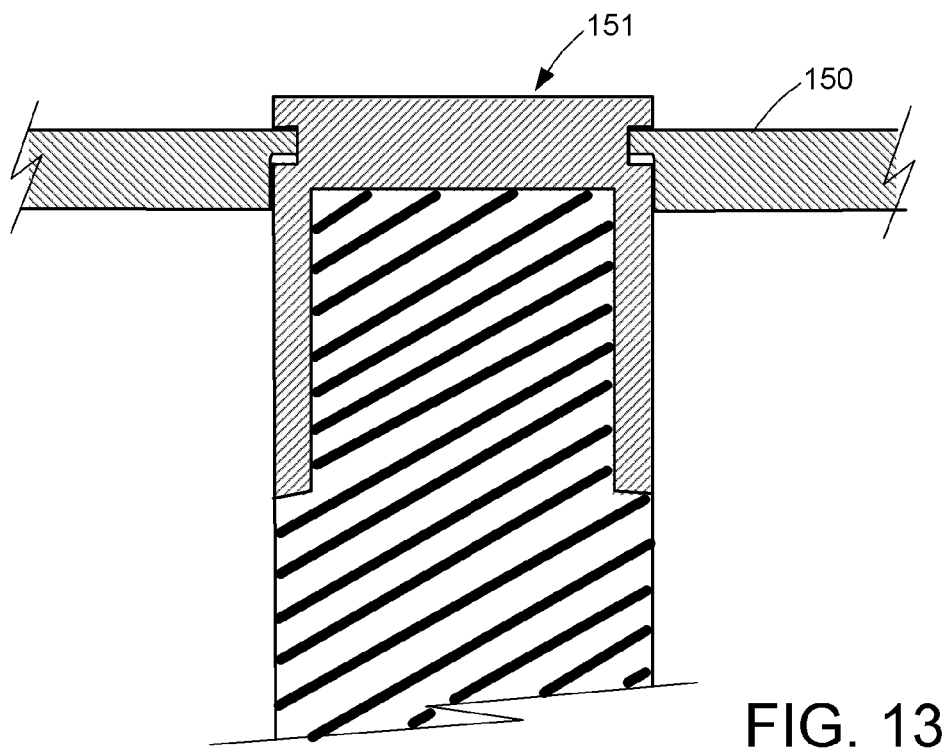
FIG. 13 is a section view along section line 13-13 in FIG. 12.
Figure 14:
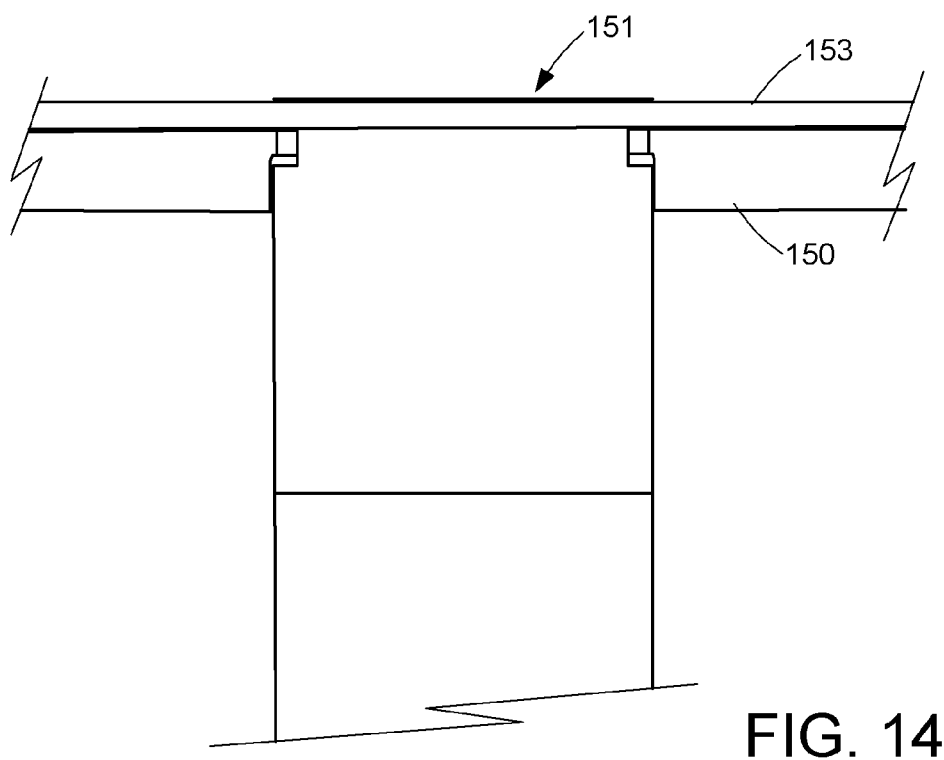
FIG. 14 is a front view corresponding to the section view of FIG. 13.

FIG. 12 shows a top view of the elastomeric load compensator 80. The eyelet 84 is fastened to a slotted disk 150 engaging the upper end caps of an outer circular array of twelve elastomeric tension elements 151, 152, etc. After the elastomeric tension elements have been assembled onto the slotted disk 150, a flat retaining ring 153 is placed on the slotted disk 150 and fastened to the slotted disk. In this fashion, the retaining ring 153 prevents the elastomeric tension elements 151, 152 from being removed from the slots in the slotted disk 150. This is further shown in FIG. 13 and FIG. 14.

Figure 15:
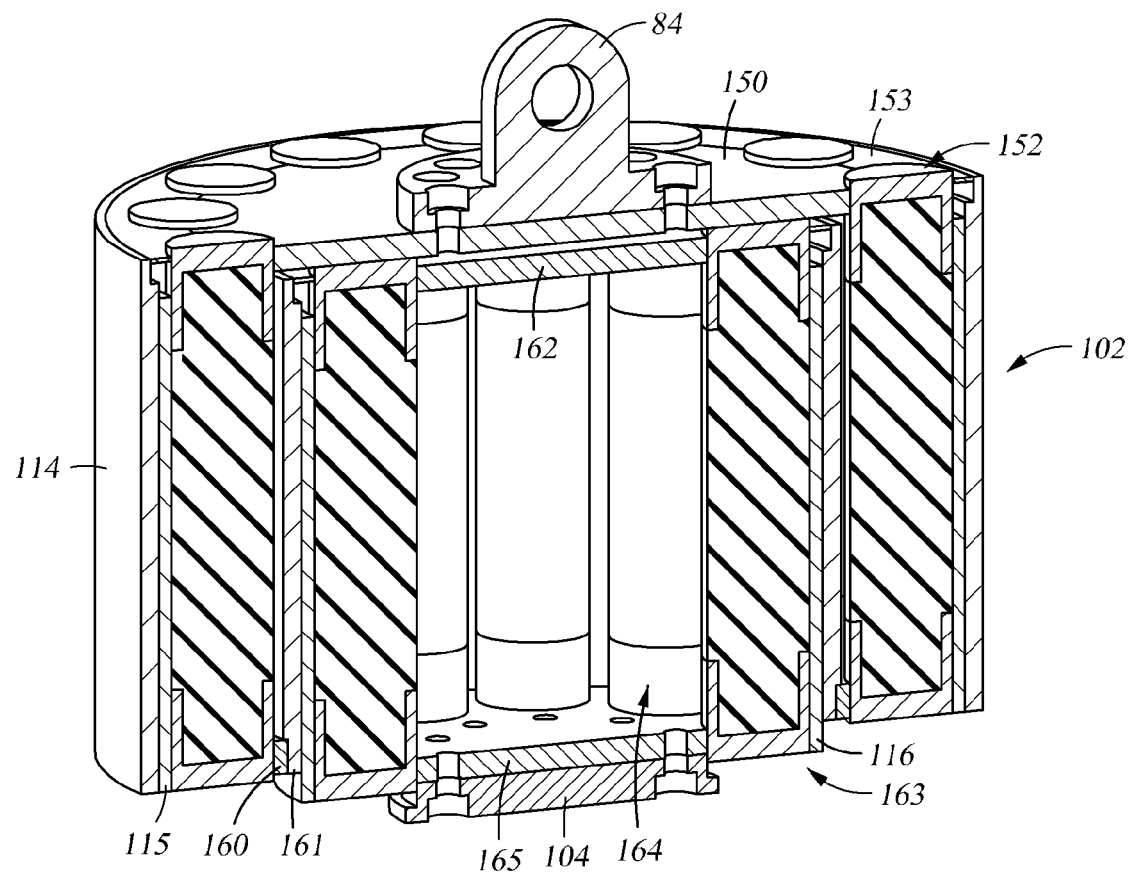
FIG. 15 is a section view along section line 15-15 of a top half of the first kind of elastomeric load compensator of FIG. 5.
Figure 16:
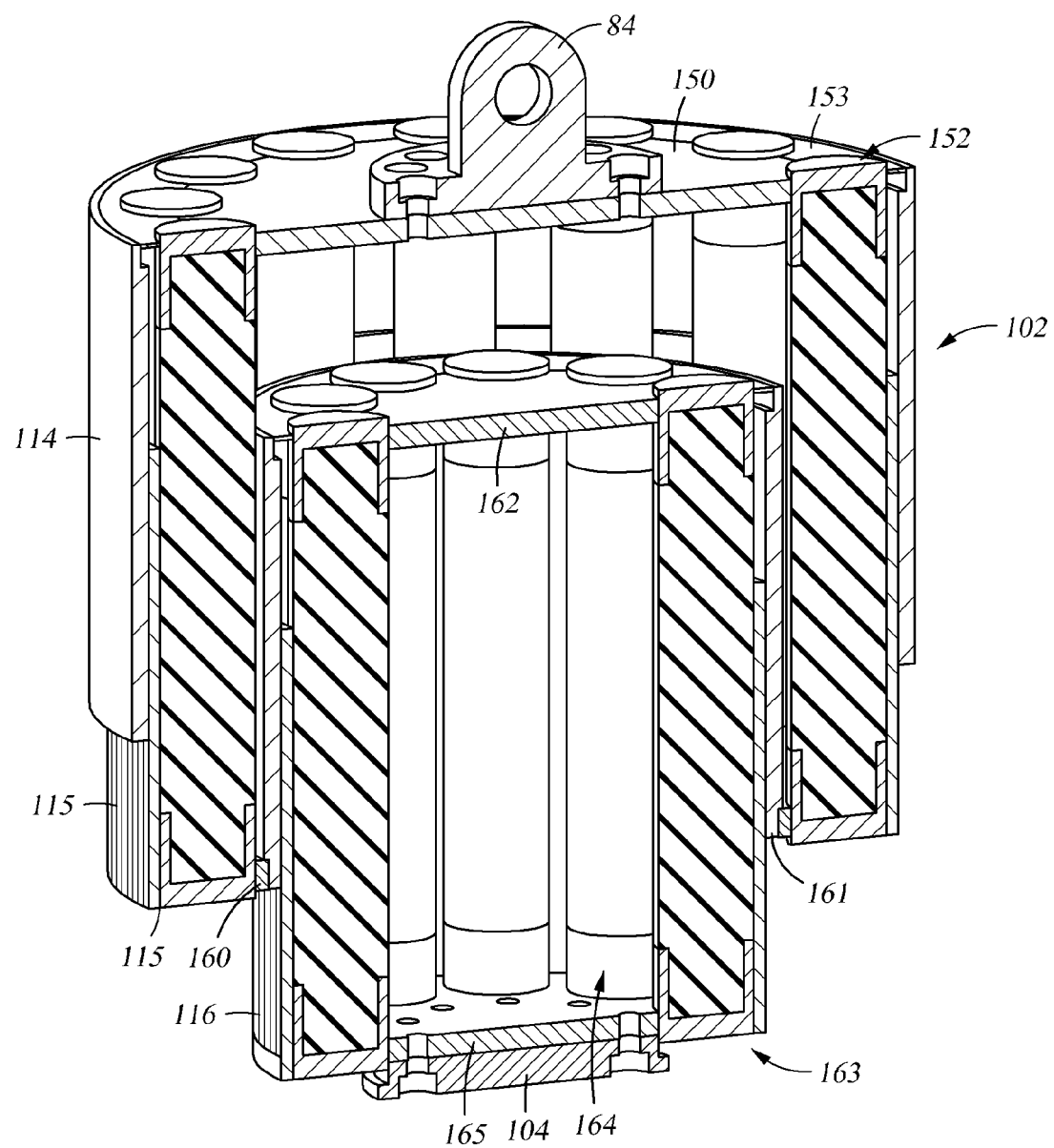
FIG. 16 is a section view corresponding to FIG. 15 but for the case of some applied tension.

FIGS. 15 and 16 show section views of the top half 102 of the elastomeric load compensator 80. The outer housing 114 is fastened to the slotted disk 150, for example by screws or welding. A steel slotted ring 160 engages the lower end caps of the outer circular array of the twelve elastomeric tension elements 151, 153. The first inner housing 115 is fastened to the slotted ring 160. The slotted ring 160 is also welded to a steel tubular cylinder 161 housing an inner array of ten elastomeric tension elements 163, 164 etc. The cylinder 161 is also fastened to a slotted steel disk 162. Thus, the cylinder 161 transmits tension from the slotted disk 162 to the slotted ring 160. The slotted disk 162 engages the upper end caps of the inner array of ten elastomeric tension elements 163, 164, etc. A slotted disk 165 engages the lower end caps of the inner array of ten elastomeric tension elements 163, 164, etc. The flange 104 is secured to the slotted disk 165. The second inner housing 116 is fastened to the slotted disk 165.

The top half 102 of the elastomeric load compensator 80 is conveniently assembled in an inside-out fashion. For example, the flange 104 is first secured to the slotted disk 165. Then the inner array of elastomeric tension elements 163, 164, etc. is assembled into the slotted disk 165 and the slotted disk 162. Then the second inner housing 116 is placed over the inner array of elastomeric tension elements 163, 164, etc. and fastened to the slotted disk 165. The slotted ring 160 is fastened to the inner housing 161, and then the inner housing 161 is placed over the second inner housing 116 and fastened to the slotted disk 162. The eyelet 84 is secured to the slotted disk 150. Then the outer array of elastomeric tension elements 151, 152, etc. is assembled into the slotted ring 160 and the slotted disk 150. Then the first inner housing 115 is placed over the outer array of elastomeric tension elements 151, 152, etc., and fastened to the slotted ring 160. Then the outer housing 114 is placed over the outer array of elastomeric tension elements 151, 152, etc., and the outer housing 114 is fastened to the slotted disk 150.

Figure 17:
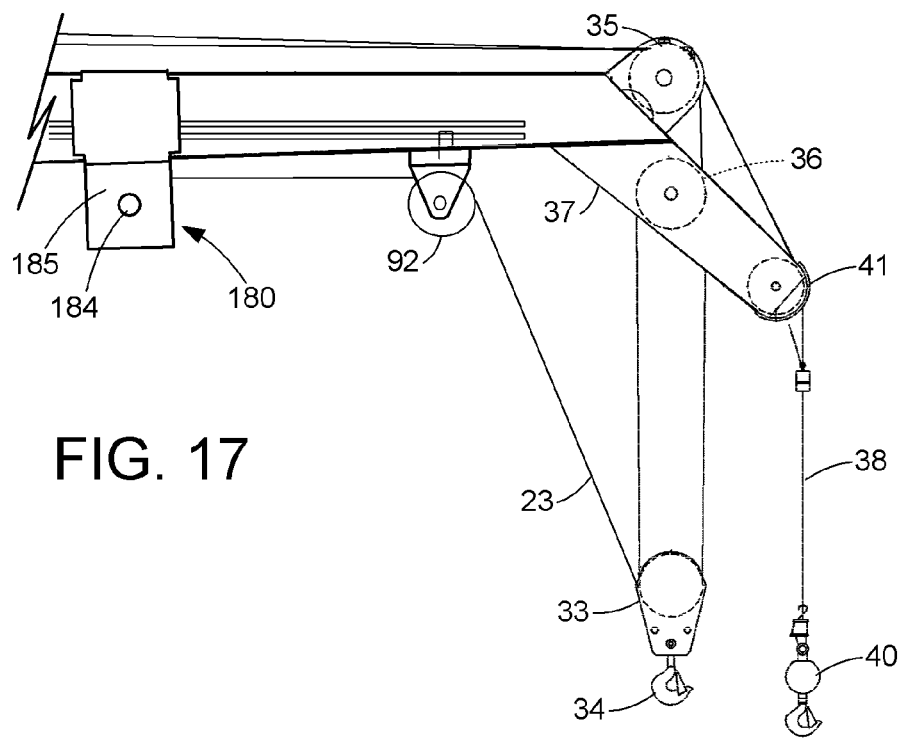
FIG. 17 shows a second kind of elastomeric load compensator installed in the crane of FIG. 1 under the boom for receiving the dead end of the main hoist rope.
Figure 18:
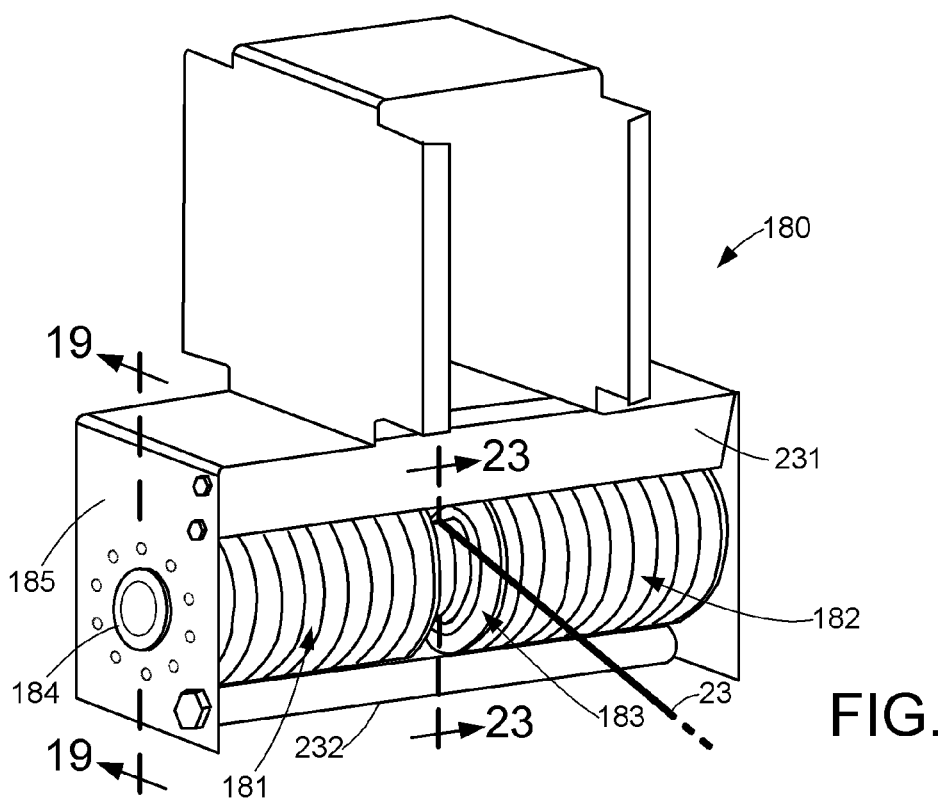
FIG. 18 is an oblique view of the second kind of elastomeric load compensator introduced in FIG. 17.

FIGS. 17 and 18 show a second kind of elastomeric load compensator 180 employing two identical elastomeric torsion assemblies (181 and 182 in FIG. 18). This elastomeric load compensator 180 is more compact for permanent attachment to the underside of the boom 22 to receive the dead end of the main hoist wire rope 23. As shown in FIG. 18, the elastomeric load compensator 180 has a reel-out sheave (183 in FIG. 18) attached to the elastomeric torsion assemblies 181 and 182 and rotating on a shaft 184. The shaft 184 is mounted to a frame 185 that wraps around the boom 22. The dead-end of the main hoist wire rope 23 is attached to the real-out sheave 183. As shown in FIG. 17, the main hoist wire rope 23 runs over the idler sheave (92 in FIG. 17) before running to the main load block (33 in FIG. 17).

As shown in FIG. 18, the elastomeric load compensator 180 also has a steel rail 231 parallel-spaced from the shaft 184, and a metal or composite tube 232 also parallel-spaced from the shaft 184. The rail 231 and the tube 232 are connected at their ends to the frame 185.

Figure 19:
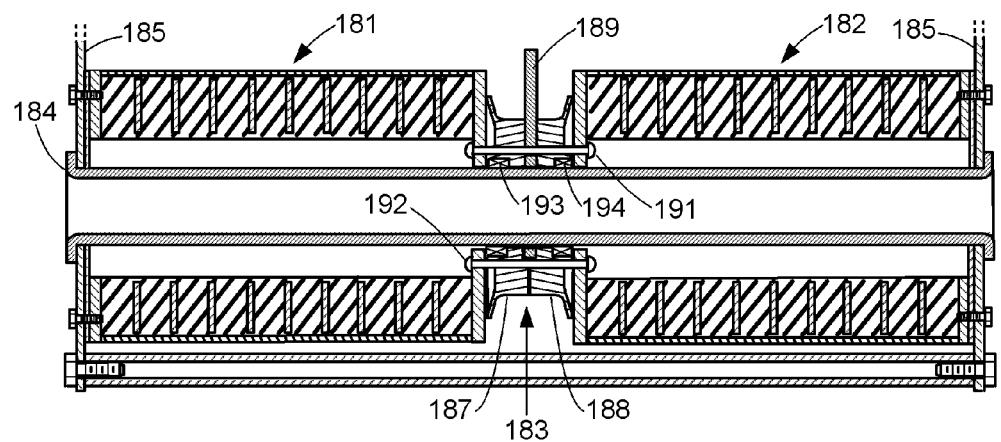
FIG. 19 is a section view along section line 19-19 in FIG. 18.

FIG. 19 shows that reel-out sheave 183 is split into two parts 187 and 188 so that a steel padeye bar 189 can be inserted between the two parts so as to be imbedded in the reel-out sheave. (As further shown in FIG. 23 below, the dead end 32 of the main hoist wire rope 23 is attached to this padeye bar 189.) Fasteners 191, 192 hold the two parts 187, 188 of the real-out sheave 183 together and also secure the reel-out sheave to an inner end of each of the elastomeric torsion assemblies 181, 182. An outer end of each of the elastomeric torsion assemblies 181, 182 is stationary and is connected to the frame 185. Each of the elastomeric torsion assemblies 181, 182 is cylindrical and has radial symmetry about the shaft 184 in order to provide a rather uniform torsional deformation in response to angular displacement of the real-out sheave 183 around the shaft 184. In this example, the real-out sheave 183 has ball bearings 193 and 194, and the shaft 184 remains stationary as the real-out sheave 183 rotates about the shaft.

Figure 20:
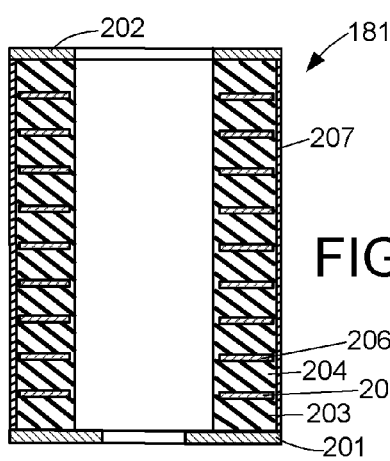
FIG. 20 is a section view of a single elastomeric torsion element introduced in FIG. 19.

FIG. 20 shows that the elastomeric torsion assembly 181 includes a flat metal or composite ring 201, 202 at each end, and a series of annular elastomeric torsion elements 203, 204, etc. in the form of rubber pads, and flat metal or composite reinforcement rings 205, 206, etc. separating the rubber pads. For example, the flat metal rings 201, 202 and the flat metal reinforcement rings 205, 206 are made of steel. The elastomeric torsion assembly 181 also has a protective outside layer 207 of soft rubber in comparison to the annular rubber pads 203, 204, etc. The annular rubber pads 203, 204 carry the torsional load while the outside layer 207 offers much less resistance under greater shear deformation.

Figure 21:
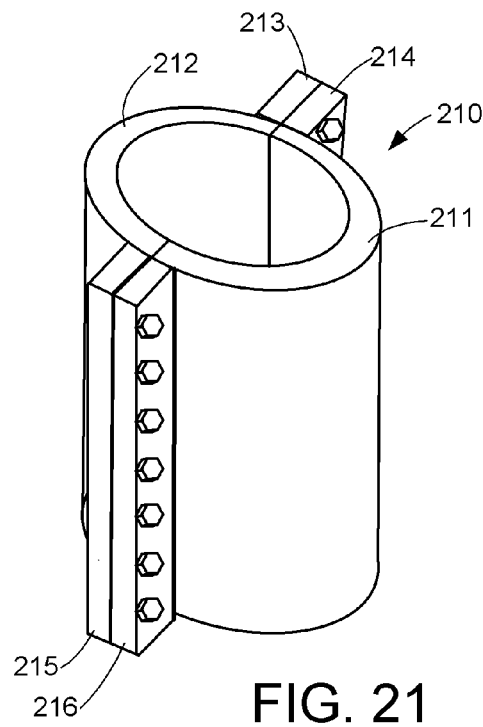
FIG. 21 is an isometric view of a split cylindrical mold for molding the elastomeric torsion element of FIG. 20.

The elastomeric torsion assembly 181 could be made by stacking the flat metal or composite rings 201, 203, 205, 206, etc. and the annular rubber pads 203, 205, etc. in a split cylindrical steel mold 210 shown in FIG. 21. The mold 210 has a pair of semi-cylindrical sections 211, 212 welded to side rails 213, 214, 215, 216, which are bolted together to close the mold 210.

Figure 22:
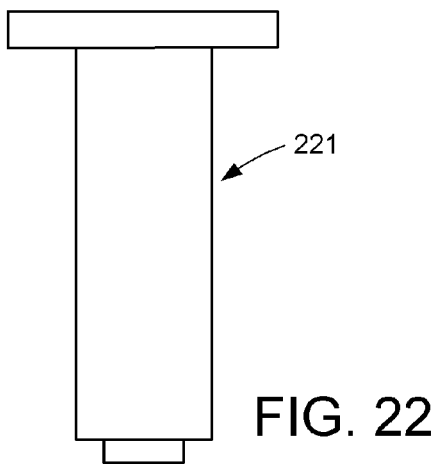
FIG. 22 is a front view of a mandrel used in molding the elastomeric torsion element of FIG. 20.

Prior to stacking in the mold 210, the surfaces of the flat metal rings that will be adjacent to the rubber pads are coated with a rubber-to-metal bonding agent of the kind described above. Then a cylindrical steel mandrel 221 as show in FIG. 22 is inserted into the mold 210 and put under pressure, and then elastomer mixed with a vulcanizing agent is injected into the mold, and the mold is heated to cure the bonding agent and the injected elastomer. The elastomer, for example, is natural or nitrile butadiene rubber, and the vulcanizing agent is sulfur.

Figure 23:
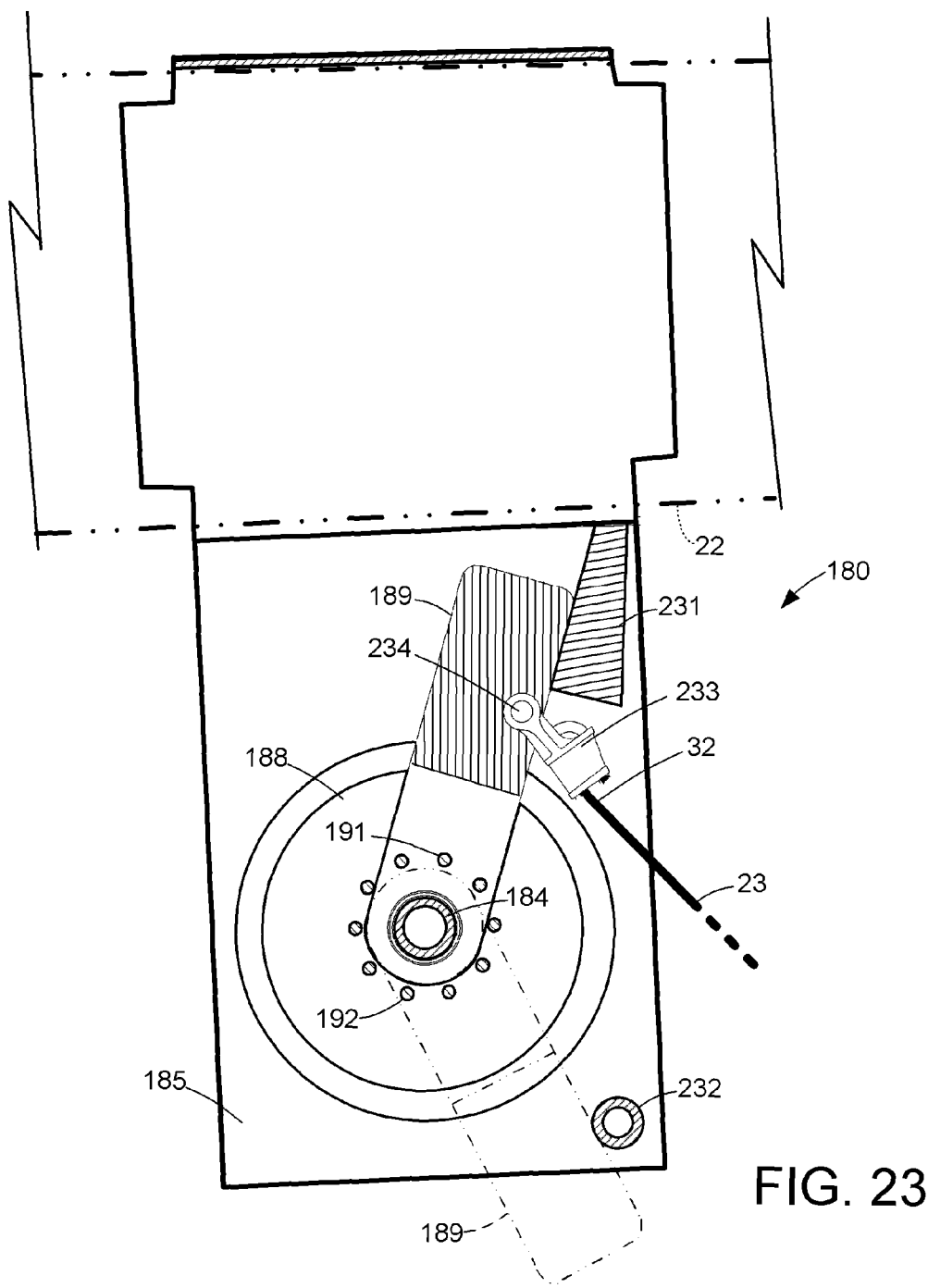
FIG. 23 is a section view along section line 23-23 in FIG. 18.

FIG. 23 shows the padeye bar 189 seated in a conforming milled-out section of the sheave portion 188. An open wedge socket 233 terminates the dead-end 32 of the main hoist wire rope 23. The open wedge socket 233 is secured to the padeye bar 189 by a fastener 345 to attach the dead-end 32 of the main hoist wire rope 23 to the padeye bar.

The padeye bar 189 is shown in solid lines at a position of maximum torsion upon the elastomeric torsion elements of the elastomeric load compensator 180. At this position of maximum torsion, further rotation of the padeye bar 189 and sheave portion 188 about the shaft 184 is stopped by contact of the padeye bar 189 with the rail 231. The padeye bar 189 is also shown in phantom lines at a position of minimum torsion, at which the padeye bar 189 rests upon the tube 232. The rail 231 has dual roles as a mechanical stop for the padeye bar 189 and as a guide for the main hoist wire rope 23 so that the wire rope cannot "jump" off of the sheave.

In contrast to the frame 185, which has the color of the boom 22 such as white or yellow, the padeye bar 189 has a contrasting color such as red so that the degree of rotation of the padeye bar 189 in response to applied tension from the main hoist wire rope 23 is clearly visible to the crane operator and any other persons near the crane. If the padeye bar 189 does not retract to its lower position in the absence of a payload, then the elastomeric load compensator 180 should be repaired or replaced. The padeye bar 189 is colored by paint, enamel, or a conforming polymeric coating.

Figure 24:
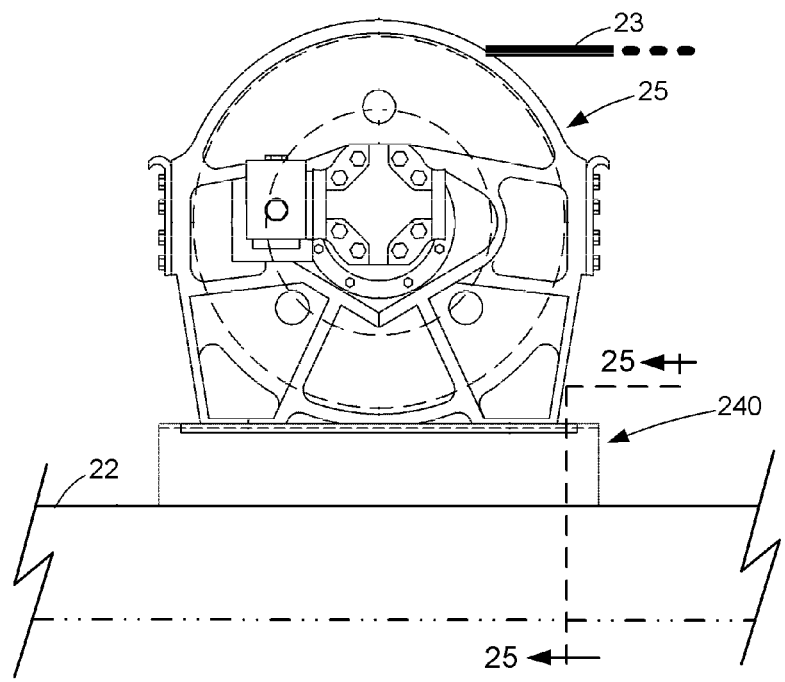
FIG. 24 is side view of a hoist winch mounted on a third kind of elastomeric load compensator.

FIG. 24 shows a third kind of elastomeric load compensator 240 that has been installed to mount the main hoist winch 25 to the boom 22. In this case, tension applied by the main hoist winch 25 to the main hoist wire rope 23 causes shear deformation of the elastomeric load compensator 240 so that there is some displacement of the main hoist winch 25 with respect to the boom 22 in the longitudinal direction of the boom, towards the jib.

Figure 25:
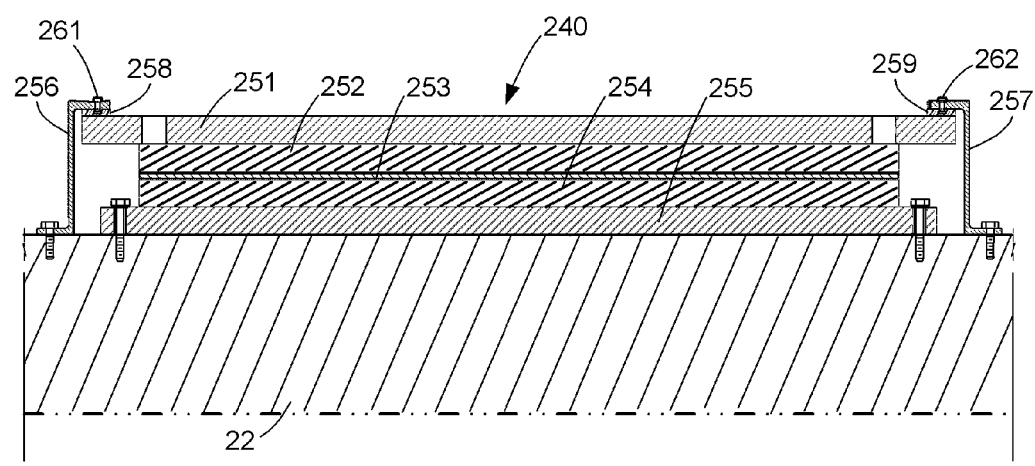
FIG. 25 is a section view of the third kind of elastomeric load compensator along section line 25-25 in FIG. 24.

FIG. 25 shows a section view of the elastomeric load compensator 240 in the transverse direction across the boom 22. The elastomeric load compensator comprises a stack of rectangular metal or composite and rubber layers, including a metal or composite hoist or sheave mounting plate 251, a first rubber plate 252, a metal or composite reinforcing shim 253, a second rubber plate 254, and a metal or composite structure mounting plate 255. The structure mounting plate 255 is bolted or welded to the crane structure such as the boom 22 in the crane 20 of FIG. 1. In the crane 50 of FIG. 2, the structure plate 255 could be bolted or welded to the structure of the swing-circle assembly 56 that also mounts the operator cab 62, the diesel engine 63, and the hydraulic pump 64. The rubber plates 252, 254 are bonded to the metal or composite plates 251, 253, 255 by applying a metal-to-rubber bonding agent, as described above, to the neighboring metal or composite and rubber surfaces, and curing the bonding agent by applying heat and pressure to the stack of metal or composite plates and rubber layers.

The elastomeric load compensator 240 further includes longitudinal retaining brackets 256, 257 carrying plastic wear strips 258, 259. For example, the plastic wear strips 258, 259 are made of NYLATRON® brand of nylon plastic loaded with molybdenum disulfide lubricant power. The plastic wear strips 258, 259 are fastened to the longitudinal retaining brackets 256, 257 by nylon rivets 261, 262. The plastic wear strips 258, 259 contact the hoist or sheave mounting plate 251 in order to dampen any vibration that would tend to separate the plates in the stack while the hoist or sheave mounting plate 251 moves in the longitudinal direction as tension is applied to and released from the hoist or sheave that is mounted to the hoist or sheave mounting plate. If there would be any separation of the bonding between the rubber layers 252, 254 and the metal or composite plates 251, 253, 255, the longitudinal retaining brackets 256, 257 would nevertheless keep the stack of plates together, so that a hoist or sheave (such as the main hoist winch 25 in FIG. 24) mounted to the hoist or sheave mounting plate 251 would still be retained to the crane structure such as the boom 22.

Figure 26:
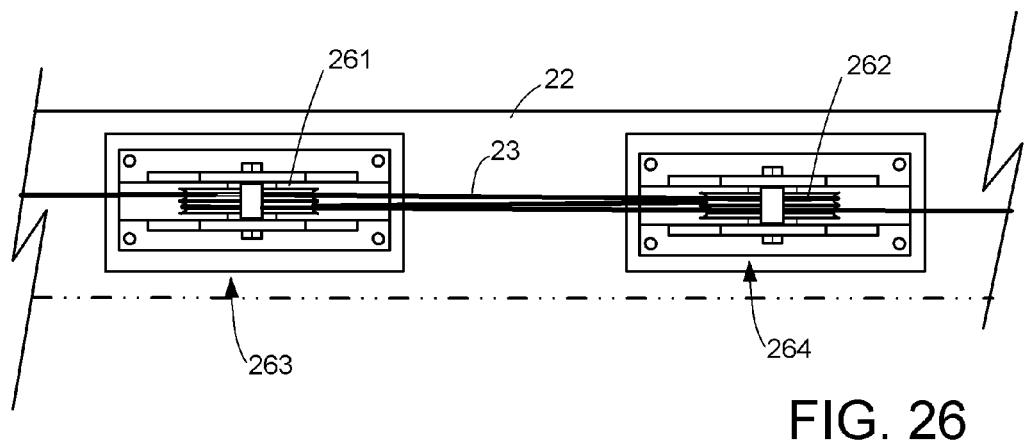
FIG. 26 is a top view of a pair of idler sheaves mounted to the boom of a crane via the third kind of elastomeric load compensators.
Figure 27:
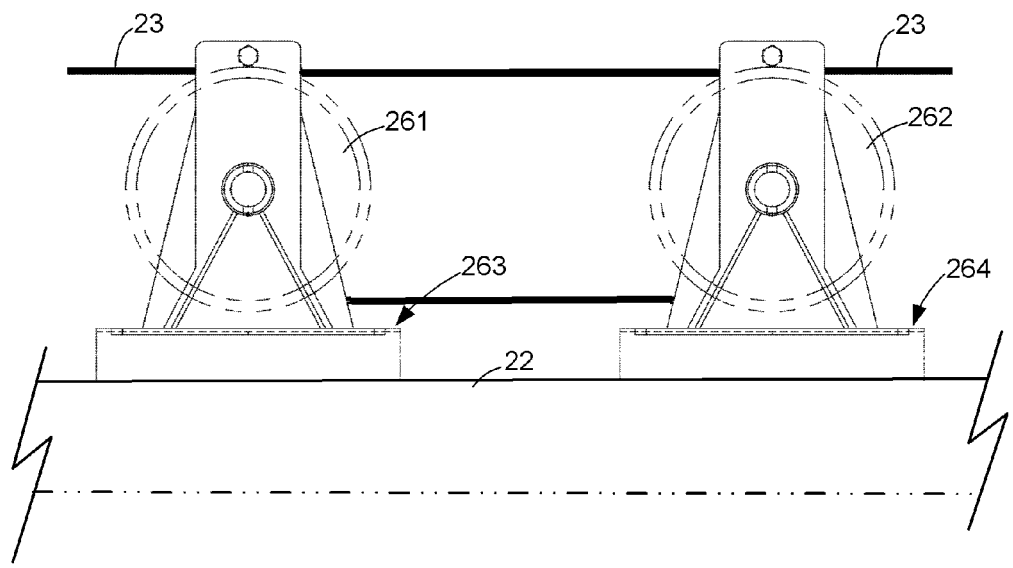
FIG. 27 is a side view of the assembly in FIG. 26.

FIGS. 26 and 27 show a pair of idler sheaves 261, 262 mounted to the boom 22 of a crane via respective elastomeric load compensators 263, 264 of the kind having stacked rectangular steel and rubber sheets bonded to each other, as described above with respect to FIG. 25. The idler sheaves 261, 262, for example, are installed on top of the boom 22 about midway between the ends of the boom, so that the idler sheaves 261, 262 may replace one or more fleet angle idlers that would otherwise be installed on the boom. The main hoist wire rope 23 loops over and back from each of the idler sheaves 261, 262 so that the shear force applied to the sheave mounting plate of each of the elastomeric load compensators 363, 364 is twice the tension on the main hoist wire rope 23.

Figure 28:
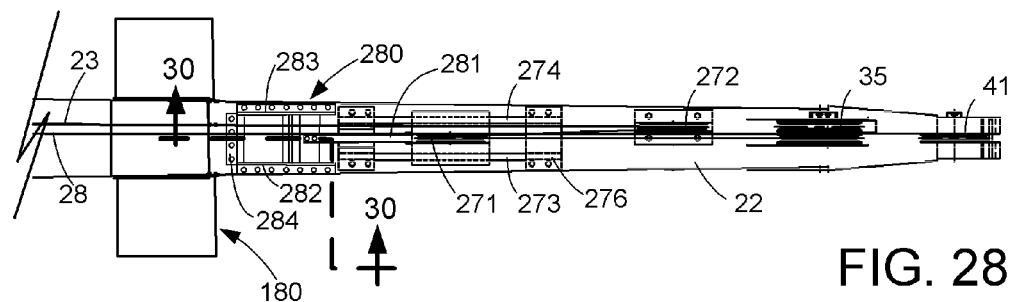
FIG. 28 is a top view of a pair of idler sheaves and associated elastomeric load compensators mounted to the top of the boom of the crane introduced in FIG. 17.
Figure 29:
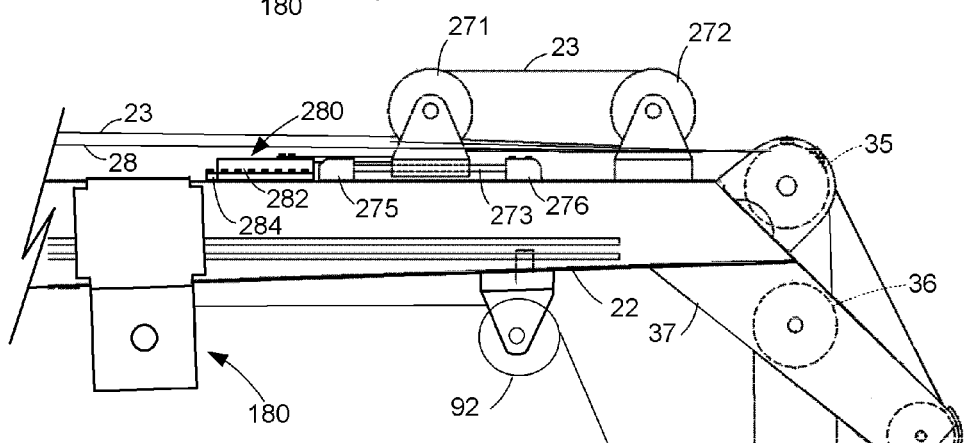
FIG. 29 is a side view of the assembly in FIG. 28.

FIGS. 28 and 29 show another way of using an additional pair of sheaves 271, 272 mounted on the boom 22 for providing additional elasticity with respect to the main hoist wire rope 23. In this example, a first sheave 271 is mounted on a pair of rails 273, 274 to permit sliding of the sheave with respect to the boom 22. A pair of brackets 275, 276 mounts the rails to the boom 22 and also function as limit stops for longitudinal displacement of the sheave 271 in response to variation in tension upon the main hoist wire rope 23. The second sheave 272 has a fixed mounting to the boom 22, or else the second sheave may be mounted to the boom via the third kind of elastomeric load compensator as described above with respect to FIG. 25.

Because the first sheave 271 is mounted for sliding with respect to the boom, any of the elastomeric load compensators described above could be used for compensating the sliding motion of the first sheave. For the box-frame boom 22, it is most convenient to use an elastomeric load compensator 280 including a series of the third kind of elastomeric load compensator employing stacked rectangular steel and rubber plates. In this case, the elastomeric load compensator 280 has a low profile so that it may be mounted on top of the boom 22 below the main hoist wire rope 23 and the auxiliary hoist wire rope 28. The elastomeric load compensator 280 is coupled to the sheave 271 via a bar 281. The elastomeric load compensator 280 has longitudinal retaining brackets 282, 283 bolted or welded to the boom 22, and a crane structure mounting plate 284 bolted or welded to the boom.

Figure 30:
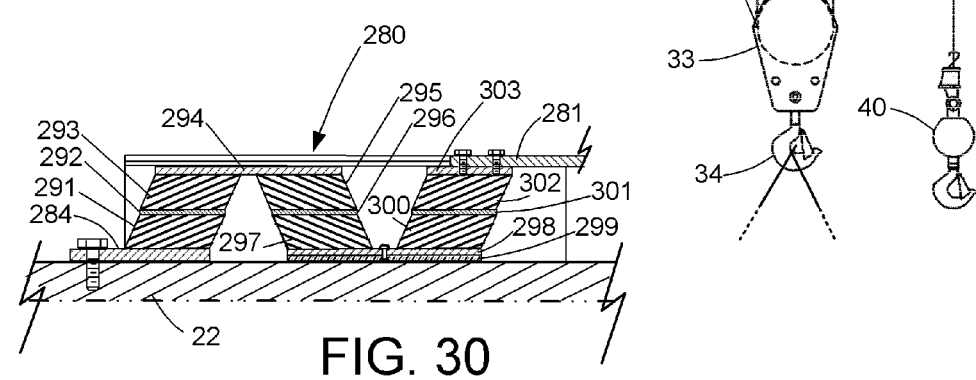
FIG. 30 is a section view of an elastomeric load compensator assembly along section line 30-30 in FIG. 28.

FIG. 30 shows the elastomeric load compensator 280 under tension. The elastomeric load compensator 280 includes a series of three stacks of rectangular steel and rubber plates. The first stack includes the crane structure mounting plate 284, a rubber plate 291, a steel reinforcing shim 292, a rubber plate 293, and a steel bridge plate 294. The second stack includes the steel bridge plate 294, a rubber plate 295, a steel reinforcing shim 296, a rubber plate 297, and a steel bridge plate 298. The steel bridge plate 298 is coplanar with the metal mounting plate 284. A plastic wear plate 299 of nylon plastic loaded with molybdenum disulfide powder is fastened to the underside of the steel bridge plate 298 to facilitate sliding of the bridge plate 298 over the top surface of the boom 22. The third stack includes the steel bridge plate 298, a rubber plate 300, a steel reinforcing shim 301, a rubber plate 302, and a steel plate 303. The steel plate 303 is coplanar with the steel bridge plate 294 and connected to the bar 281.

It is also possible to mount a winch or hoist to rails secured to the crane structure, so that the winch or hoist may move forward and backward with respect to the load line leaving the winch or hoist, and to attach an elastomeric load compensator between the winch or hoist and the crane structure. In this fashion, the displacement of the winch or hoist may exceed the maximum displacement for the elastomeric load compensator of FIGS. 24 and 25. Thus, the displacement of the winch or hoist due to heave motion of a payload can be compensated by an elastomeric load compensator including multiple stacks of steel and rubber plates under shear as in FIG. 30, or an elastomeric load compensator including elastomeric tension elements as in FIGS. 11-16, or an elastomeric load compensator including rubber rings under torsion as in FIGS. 18-19 and 23.

In view of the above, there have been described elastomeric load compensators for heave compensation of a crane. The elastomeric load compensators are compact, convenient, reliable, and relatively lightweight mechanisms for load compensation in comparison to the mechanical spring, counterweight, and hydraulic mechanisms that have been used for crane heave compensation. The elastomeric load compensators are configured for placement at one or more locations on the crane, and may provide linear or progressive spring rates and shock and vibration absorption as appropriate for the particular location of the load compensator. The elastomeric load compensators may employ elastomeric tension elements, elastomeric torsion elements, or elastomeric shear elements. The elastomeric elements can be connected in parallel for increased reliability and load handling capability, and in series to further reduce the Dynamic Factor (Cv). An elastomeric load compensator employing elastomeric tension elements is suitable for simple insertion in series with the main hoist wire rope of a crane, with no or minimal modification to the boom of the crane. An elastomeric load compensator employing elastomeric torsion elements is suitable for mounting to the underside of the boom for receiving the live end of the main hoist wire rope. An elastomeric load compensator including a single stack of elastomeric shear elements is suitable for mounting a hoist or winch to the crane structure such as the swing circle assembly or the end of the boom proximal to the swing circle assembly, or for mounting sheaves to the upper surface of the boom in lieu of fleet angle idlers. These various techniques can be used simultaneously in combination on the same crane. Additional heave compensation can be obtained by mounting the hoists or winches and idler sheaves on rails for increased displacements under heave loads, and by compensating the increased displacements by elastomeric load compensators including elongated elastomeric tension elements or multiple elastomeric torsion elements connected mechanically in series or multiple elastomeric shear elements connected mechanically in series.

What is claimed is:

1. A crane comprising:
a base;
a boom mounted to the base;
a hoist rope descending from the boom for attachment to a payload; and
a host mechanism mounted to at least one of the base and the boom for applying tension to the hoist rope to lift the payload;
wherein the crane has a stiffness from the payload to the base;
wherein the crane further includes an elastomeric load compensator, having a housing comprised of telescoping components, coupled between the payload and the base for reducing the stiffness of the crane;
wherein the tension applied to the hoist rope places elastomer of the elastomeric load compensator in tension and causes elongation of elastomer of the elastomeric load compensator.

2. The crane as claimed in claim 1, wherein the elastomeric load compensator is in line with the hoist rope.

3. The crane as claimed in claim 1, wherein the elastomeric load compensator is attached to the hoist rope between the boom and the payload.

4. The crane as claimed in claim 1, wherein the tension applied to the hoist rope places elastomer of the elastomeric load compensator in tension and causes elongation of elastomer of the elastomeric load compensator.

5. The crane as claimed in claim 4, wherein the elastomeric load compensator is color-coded to indicate elongation of the elastomer to persons near the crane.

6. The crane as claimed in claim 4, wherein the elastomeric load compensator includes a multiplicity of parallel elastomeric elements that are elongated in the absence of the tension applied to the hoist rope, and which become more elongated when the tension is applied to the hoist rope.

7. A crane comprising:
a base;
a boom mounted to the base;
a hoist rope descending from the boom for attachment to a payload; and
a host mechanism mounted to at least one of the base and the boom for applying tension to the hoist rope to lift the payload;
wherein the crane has a stiffness from the payload to the base;
wherein the crane further includes an elastomeric load compensator coupled between the payload and the base for reducing the stiffness of the crane;
wherein the elastomeric load compensator comprises:
elongated elastomeric tension elements, each of the elongated elastomeric tension elements including an elastomer body and a pair of end caps made of a rigid material and bonded to ends of the elastomer body, and
a pair of end plates made of rigid material for applying tension to the elongated elastomeric tension elements, the pair of end plates mechanically connecting the elongated elastomeric tension elements in parallel with respect to the applied tension.

8. The crane of claim 7, wherein the elastomeric load compensator further includes an eyelet secured to one of the end plates for applying the tension to the elastomeric load compensator.

9. The crane of claim 7, wherein the elastomeric load compensator further includes a flange secured to one of the end plates for applying the tension to the elastomeric load compensator.

10. The crane of claim 7, wherein the elastomeric load compensator further includes a telescoping housing enclosing the elongated elastomeric tension elements.

11. The crane of claim 10, wherein the telescoping housing includes housing members having contrasting colors so that one of the contrasting colors becomes visible when tension is applied to the elongated tension members.

12. The crane of claim 7, wherein each of the end plates is slotted to receive one of the metal caps of each of the elongated elastomeric tension elements.

13. The crane of claim 12, wherein the end plates are circular, and the elastomeric tension members are parallel to each other and arranged in a circular array.

14. The crane of claim 13, wherein the elastomeric load compensator further includes another circular array of elongated elastomeric tension elements so that the elastomeric load compensator includes two circular arrays of elastomeric tension elements, and the two circular arrays of elastomeric tension elements are mechanically connected in series with each other respect to a load applied to the elastomeric load compensator.

15. The crane of claim 14, wherein one of the two circular arrays of elastomeric tension elements is nested within another of the two circular arrays of elastomeric tension elements.

16. A crane comprising:
a base;
a boom mounted to the base;
a hoist rope descending from the boom for attachment to a payload; and
a host mechanism mounted to at least one of the base and the boom for applying tension to the hoist rope to lift the payload;
wherein the crane has a stiffness from the payload to the base;
wherein the crane further includes an elastomeric load compensator coupled between the payload and the base for reducing the stiffness of the crane;
wherein the elastomeric load compensator is mounted to the boom, and a dead end of the hoist rope is attached to the elastomeric load compensator.

17. The crane as claimed in claim 16, wherein the tension applied to the hoist rope places elastomer of the elastomeric load compensator in tension and causes elongation of elastomer of the elastomeric load compensator.

18. The crane as claimed in claim 17, wherein the elastomeric load compensator is color-coded to indicate elongation of the elastomer to persons near the crane.

19. The crane as claimed in claim 17, wherein the elastomeric load compensator has a housing comprised of telescoping components.

20. The crane as claimed in claim 17, wherein the elastomeric load compensator includes a multiplicity of parallel elastomeric elements that are elongated in the absence of the tension applied to the hoist rope, and which become more elongated when the tension is applied to the hoist rope.

* * * * *